(12) United States Patent
Crabtree et al.

(10) Patent No.: US 12,401,629 B2
(45) Date of Patent: Aug. 26, 2025

(54) SYSTEM AND METHOD FOR MIDSERVER FACILITATION OF MASS SCANNING NETWORK TRAFFIC DETECTION AND ANALYSIS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 219 days.

(21) Appl. No.: 18/361,831

(22) Filed: Jul. 29, 2023

(65) Prior Publication Data

US 2024/0022547 A1 Jan. 18, 2024

Related U.S. Application Data

(63) Continuation-in-part of application No. 18/336,873, filed on Jun. 16, 2023, which is a continuation-in-part of application No. 18/297,500, filed on Apr. 7, 2023, which is a continuation-in-part of application No. 18/169,203, filed on Feb. 14, 2023, now abandoned, which is a continuation-in-part of application No. 17/245,162, filed on Apr. 30, 2021, now Pat. No. 11,582,207, application No. 18/361,831 is a continuation-in-part of application No. 16/412,340, filed on May 14, 2019, now Pat. No. 11,539,663, which is a continuation-in-part of application No.
(Continued)

(51) Int. Cl.
*H04L 9/40* (2022.01)
*H04L 9/32* (2006.01)

(52) U.S. Cl.
CPC ........ *H04L 63/0428* (2013.01); *H04L 9/3236* (2013.01); *H04L 9/3239* (2013.01); *H04L 63/0807* (2013.01); *H04L 63/0815* (2013.01); *H04L 63/1425* (2013.01); *H04L 63/1433* (2013.01); *H04L 63/145* (2013.01)

(58) Field of Classification Search
CPC . H04L 63/0428; H04L 9/3236; H04L 9/3239; H04L 63/0807; H04L 63/0815; H04L 63/1425; H04L 63/1433; H04L 63/145
See application file for complete search history.

(56) References Cited

U.S. PATENT DOCUMENTS 7,072,863 B1    7/2006   Phillips et al.
8,533,819 B2 *   9/2013   Hoeflin ............... H04L 63/1425
                                             370/395.42

(Continued)

*Primary Examiner* — Oleg Korsak
(74) *Attorney, Agent, or Firm* — Galvin Patent Law LLC; Brian R. Galvin

(57) ABSTRACT

A system and method that uses midservers located between an enterprise network and an external network to provide mass scanning network traffic detection and analysis capabilities for the enterprise network. The midserver may be loaded with configurations that allow it to operate as a mass scan event detector capable of detecting network sniffers, botnets, and malicious peer-to-peer connections which can lead to security vulnerabilities. In such configurations, midserver may receive and analyze network traffic to determine if the network traffic is suspicious based on heuristic and signature-based techniques, and then generate an appropriate response action which can be implemented to mitigate the risk.

16 Claims, 19 Drawing Sheets

Related U.S. Application Data

16/267,893, filed on Feb. 5, 2019, now abandoned, which is a continuation-in-part of application No. 16/248,133, filed on Jan. 15, 2019, now abandoned, which is a continuation-in-part of application No. 15/849,901, filed on Dec. 21, 2017, now Pat. No. 11,023,284, said application No. 17/245,162 is a continuation of application No. 15/837,845, filed on Dec. 11, 2017, now Pat. No. 11,005,824, said application No. 15/849,901 is a continuation-in-part of application No. 15/835,312, filed on Dec. 7, 2017, now Pat. No. 11,055,451, and a continuation-in-part of application No. 15/835,436, filed on Dec. 7, 2017, now Pat. No. 10,572,828, said application No. 15/837,845 is a continuation-in-part of application No. 15/825,350, filed on Nov. 29, 2017, now Pat. No. 10,594,714, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation of application No. 15/790,327, filed on Oct. 23, 2017, now Pat. No. 10,860,951, said application No. 15/825,350 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, which is a continuation-in-part of application No. 15/616,427, filed on Jun. 7, 2017, now abandoned, said application No. 15/813,097 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, and a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/596,105, filed on Dec. 7, 2017, provisional application No. 62/568,298, filed on Oct. 4, 2017, provisional application No. 62/568,291, filed on Oct. 4, 2017.

(56) References Cited

U.S. PATENT DOCUMENTS

| | | | |
|---|---|---|---|
| 9,088,606 B2* | 7/2015 | Ranum | H04L 63/1416 |
| 2007/0021955 A1 | 1/2007 | Tolone et al. | |
| 2007/0043656 A1 | 2/2007 | Lancaster | |
| 2008/0010225 A1* | 1/2008 | Gonsalves | G06N 7/01 |
| | | | 706/11 |
| 2008/0027690 A1 | 1/2008 | Watts | |
| 2008/0221949 A1 | 9/2008 | Delurgio et al. | |
| 2009/0222562 A1 | 9/2009 | Liu et al. | |
| 2011/0154492 A1* | 6/2011 | Jeong | H04L 63/1416 |
| | | | 726/23 |
| 2011/0208681 A1 | 8/2011 | Kuecuekyan | |
| 2012/0116743 A1 | 5/2012 | Ayala et al. | |
| 2014/0156806 A1 | 6/2014 | Karpistsenko et al. | |
| 2014/0279762 A1 | 9/2014 | Xaypanya et al. | |
| 2015/0186427 A1 | 7/2015 | Logothetis et al. | |
| 2015/0215177 A1* | 7/2015 | Pietrowicz | H04L 45/02 |
| | | | 370/230 |
| 2015/0379424 A1 | 12/2015 | Dirac et al. | |
| 2016/0078361 A1 | 3/2016 | Brueckner et al. | |
| 2016/0092557 A1 | 3/2016 | Stojanovic et al. | |
| 2016/0164905 A1 | 6/2016 | Wood et al. | |
| 2017/0193110 A1 | 7/2017 | Crabtree et al. | |

* cited by examiner

SYSTEM AND METHOD FOR MIDSERVER FACILITATION OF MASS SCANNING NETWORK TRAFFIC DETECTION AND ANALYSIS

CROSS-REFERENCE TO RELATED APPLICATIONS

Priority is claimed in the application data sheet to the following patents or patent applications, each of which is expressly incorporated herein by reference in its entirety:
Ser. No. 18/336,873
Ser. No. 16/412,340
Ser. No. 16/267,893
Ser. No. 16/248,133
Ser. No. 15/813,097
Ser. No. 14/925,974
Ser. No. 15/806,697
Ser. No. 15/237,625
Ser. No. 15/186,453
Ser. No. 15/141,752
Ser. No. 15/091,563
Ser. No. 14/986,536
Ser. No. 15/229,476
Ser. No. 15/849,901
Ser. No. 15/835,436
Ser. No. 15/790,457
62/568,298
Ser. No. 15/790,327
62/568,291
Ser. No. 15/142,752

BACKGROUND OF THE INVENTION

Field of the Art

The disclosure relates to the field of computer technology, more specifically to computer architectures for enterprise data collection, analysis, and transmission to data center or cloud-based services.

Discussion of the State of the Art

As hybrid architectures and cloud-based computing services become more popular, management of the data collection from a business and transmission of that data to a central data center or cloud-based service for enterprise observability and security becomes more complicated. Large business enterprises can have thousands of computers and peripherals, many of which are now laptops and mobile devices. Collection, management, and security of data from those many devices and related applications becomes particularly important where data is being transferred to a cloud-based service.

When a large business enterprise uses a cloud-based computing service, heterogeneous data transfer between cloud services and large offices or campuses for organizations presents numerous operational and security problems, including lack of reliable data collection methods, poor standardized support for connection-oriented protocols by network appliances, security concerns with unfiltered or poorly filtered data, and bandwidth concerns with constantly streaming data which may result in network slowdown due to unprioritized and often inconsistent data transfer. Additionally, larger business enterprises may have thousands of computing devices sending data to a cloud-based service on separate connections, and each such connection represents an additional security risk. Further, current data collection and models do not scale well for adding new data sources and flexible ad-hoc queries, resulting in too much data being passed, no context for data and data sources oftentimes, unqueryable data and data sources, inability to flexibly and quickly add new data sources such as new devices or user accounts which generate new data for analysis, and log management and data storage become expensive and disorganized.

The problem is compounded by the use of common threat detection methods, where user experience, data management and security optimization are not possible for each organization, group or user. Particularly in the context of data ingestion, integration and persistence systems for observability and data management, it is often unclear from a data source or stream what portion of the data results in triggering of certain security alerts, requiring many costly hours of analytics at best, or resulting in missed errors or security concerns at worst.

Sorting through the large and growing corpus of operational, security, business and open source and third party data to determine what is useful, actionable information and what is just background noise can be resource intensive (e.g., computing resources, time resources, staff time etc.), but can provide data and insights into potentially surprising, malicious, or otherwise risky behavior on the network. Mass scan data can be analyzed to detect and classify both legitimate and illicit mass scanning actors and entities which interact or attempt to interact with at least one enterprise network.

What is needed is a computer architecture, system and methodology that allows for collection, aggregation, schematization, normalization, semantification, analysis, transformation and enrichment, and secure transmission of and access to data from a multitude of computing devices and peripherals at a business enterprise network to detect and analyze mass scanning network traffic.

SUMMARY OF THE INVENTION

Accordingly, the inventor has conceived, and reduced to practice, a system and method that uses midserver based sensors located between an enterprise network and an external network to provide mass scanning network traffic detection and analysis capabilities for the enterprise network—supporting both Internet and intranet data collection capabilities. The midserver may be loaded with configurations that allow it to operate as a mass scan event detector capable of detecting network sniffers, botnets, and malicious peer-to-peer connections which can lead to security vulnerabilities. In such configurations, midserver may receive and analyze network traffic to determine if the network traffic is suspicious based on heuristic and signature-based techniques, and then generate an appropriate response action which can be implemented to mitigate the risk. Midserver based analysis and response actions may be optionally independent, coordinated in part with other midservers, network tiers or tessellations, edge computing, or leverage cloud-based resources with ongoing communication between midserver and centralized cloud services.

According to a preferred embodiment, a system for network traffic mass scan event observation, detection and analysis is disclosed, comprising: a midserver comprising at least a processor, a memory, and a plurality of programming instructions stored in the memory and operating on the processor, wherein the plurality of programming instructions, when operating on the processor, cause the processor to: automatically install a virtual appliance software application, the virtual appliance software application configured to automatically load a plurality of stored configurations on the midserver; establish a secure network connection to an external network; receive data over a local network from a plurality of computing devices; receive network traffic bound for the local network; analyze the network traffic to identify if the network traffic is suspicious; determine if the network traffic is associated with a threat actor, botnet, or other entity profile by performing heuristic analysis on network traffic identified as suspicious or checking the veracity of claimed attribution from the scanning source itself or from third party threat intelligence and reputation feeds, wherein the heuristic analysis comprises monitoring the behavior of the network traffic; and execute a responsive action on the local network or cloud-based services based on the results of the analysis through deterministic rules, heuristics, statistical approaches or machine learning.

According to another preferred embodiment, a method for network traffic mass scan event detection and analysis is disclosed, comprising the steps of: automatically installing a virtual appliance software application, the virtual appliance software application configured to automatically load a plurality of stored configurations on the midserver; establishing a secure network connection to an external network; receiving data over a local network from a plurality of computing devices; receiving network traffic bound for the local network; analyzing the network traffic to identify if the network traffic is suspicious; determining if the network traffic is associated with a botnet by performing heuristic analysis on network traffic identified as suspicious, wherein the heuristic analysis comprises monitoring the behavior of the network traffic; and executing a responsive action on the local network based on the results of the heuristic analysis.

According to an aspect of an embodiment, the responsive action is generating an alert to a network administrator, the alert indicating a mass scan event has been detected.

According to an aspect of an embodiment, the mass scan event is a botnet.

According to an aspect of an embodiment, at least one computing device of the plurality of computing devices has a software agent stored and operating on the at least one computing device, the software agent configured to generate and transmit a trap packet to the midserver.

According to an aspect of an embodiment, the midserver is further configured to: receive the trap packet from the software agent; determine if the network traffic is associated with a network sniffer by configuring the midserver to determine whether received network traffic is the trap packet or a non-trap packet based on at least a subset of the stored plurality of configurations on the midserver; and generate an alert to a network administrator, the alert indicating a mass scan event has been detected.

According to an aspect of an embodiment, the mass scan event is performed by a network sniffer.

According to an aspect of an embodiment, the midserver is further configured to: determine if the network traffic is associated with a request for information from a peer-to-peer (P2P) application by using protocol-based signature detection; and execute a responsive action on the local network based on the results of the protocol-based signature detection.

According to an aspect of an embodiment, the responsive action is blocking the P2P application from connecting with local network.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
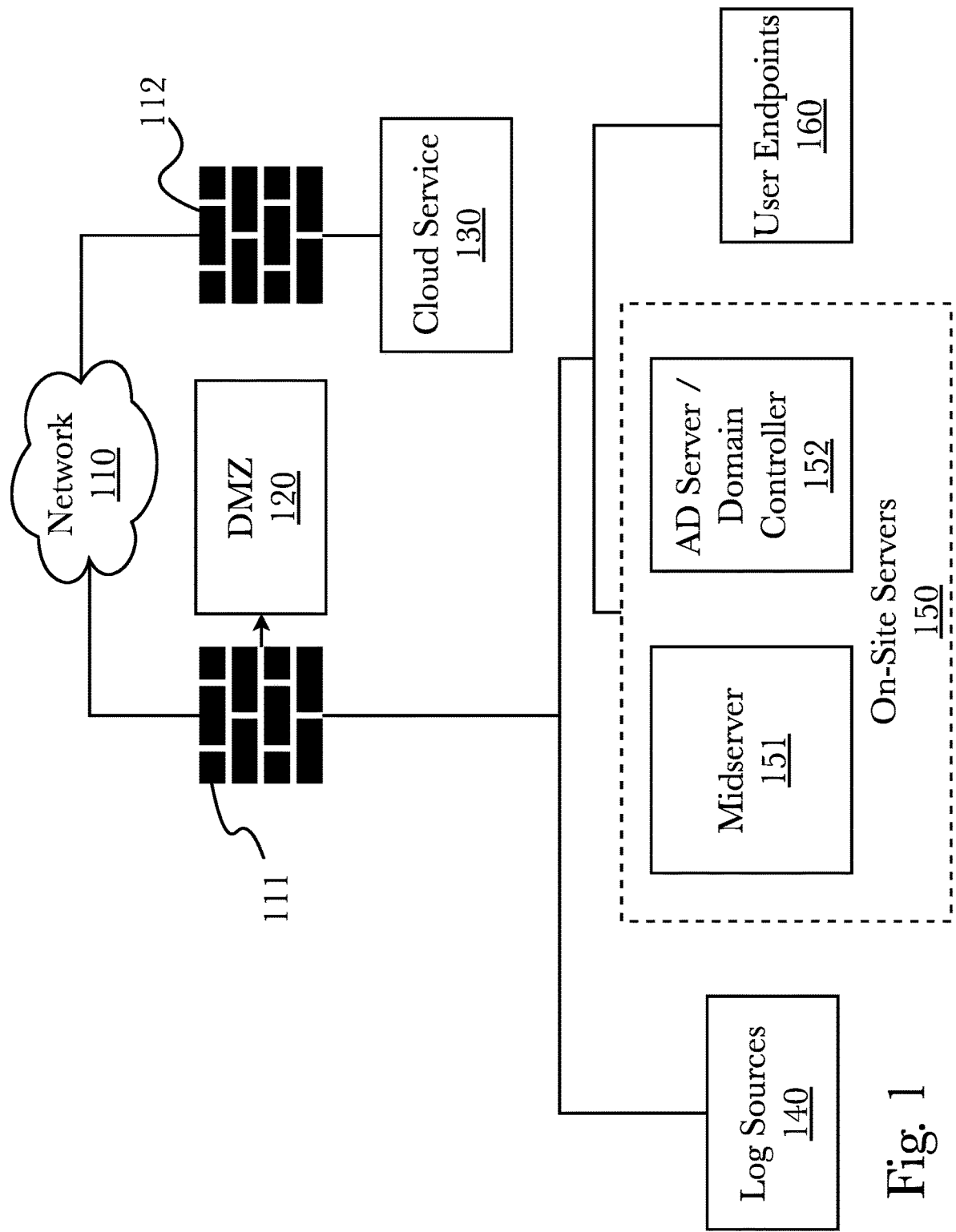
FIG. 1 is a diagram of an exemplary midserver system architecture.

The inventor has conceived, and reduced to practice, a system and method that uses midservers located between an enterprise network and an external network to provide mass scanning network traffic detection and analysis capabilities for the enterprise network. The midserver may be loaded with configurations that allow it to operate as a mass scan event detector capable of detecting network sniffers, botnets, and malicious peer-to-peer connections which can lead to security vulnerabilities. In such configurations, midserver may receive and analyze network traffic to determine if the network traffic is suspicious based on heuristic and signature-based techniques, and then generate an appropriate response action which can be implemented to mitigate the risk.

A network may be local (e.g., WLAN) or global (e.g., the Internet), but no matter the size of the network it still produces various "background noise." This noise refers to non-targeted, widespread scanning and attack activities conducted by various actors, such as botnets, research organizations, and security scanners. It consists of benign and often automated actions, such as scanning, probing, crawling, and other non-malicious activities performed by legitimate entities, research organizations, security scanners, or even unintentional misconfigurations. Background noise is a prevalent aspect of the internet due to the vast number of interconnected devices, services, and systems continuously interacting with each other. It is a natural byproduct of the internet's complexity and diversity. Some common examples of background noise include, but are not limited to, network scanning, security probing, botnet activity, search engine crawling, and network misconfigurations (e.g., unintentional misconfigurations in network devices or services can result in unintended traffic and contribute to background noise. These misconfigurations can generate excessive log messages, erroneous requests, or unintended network broadcasts.)

A network of passive sensors (e.g., agents) that monitor Internet (and network traffic on network connected devices) traffic and capture information about scanning and attack activities. These agents collect data from a diverse range of sources, including botnets, scanners, and even legitimate entities such as search engine crawlers. By aggregating and analyzing this data, the system can identify patterns, trends, and emerging threats. The system may monitor and analyze mentions of IP address or infrastructure associated with scanning and attack activities. In some implementations, the system can maintain a comprehensive data of known scanners, botnets, and other sources of background noise. By tracking and analyzing mentions of these entities, the system can provide valuable information to organizations, such as identifying which IP addresses or systems are likely engaging in benign or malicious activity.

The disclosed system and method provide a means for mass network scanning traffic detection and analysis using a midserver. Mass network scanning refers to the process of systematically scanning a large number of IP addresses or network ranges to identify hosts, open ports, and potential vulnerabilities. Network sniffers can play a role in this process by capturing and analyzing the network traffic of the target systems. A network sniffer captures packets of data as they traverse a network, allowing users to inspect and analyze the contents of those packets. It can monitor and capture network traffic in real-time or capture traffic for later analysis. Network sniffers operate at the data link layer of the network stack, capturing packets at a low level before they are processed by higher layers. Network sniffers can be used by attackers during the reconnaissance phase of a cyber-attack. By capturing and analyzing network traffic, attackers can gather information about the network's topology, identify active hosts, discover services and protocols in use, and gain insights into potential vulnerabilities. This information helps attackers plan and execute targeted attacks more effectively. Network sniffers can be used to facilitate man-in-the-middle attacks on a network. Therefore, it is useful to be able to identify a network sniffer interacting with a given network and to take some action based on the identification.

Botnets can play a significant role in mass scanning networks by providing the necessary infrastructure and resources for conducting large-scale scanning activities. A botnet can contribute to mass scanning in various ways. Botnets consist of a network of compromised computers or devices under the control of a bot master. Each compromised device, or bot, within the botnet can be leveraged to perform scanning activities. By distributing the scanning workload across numerous bots, a botnet can conduct mass scanning operations more efficiently and at a larger scale than an individual device. Botnets can be programmed to systematically scan large ranges of IP addresses or entire network segments. This enables the botnet to identify and catalog potential targets for further exploitation or attacks. By coordinating the scanning activities across multiple bots, the botnet can cover a vast number of IP addresses, discovering active hosts and open ports. Botnets often utilize specialized scanning tools and techniques to maximize the effectiveness and speed of scanning operations. These tools leverage various scanning techniques, such as TCP and UDP port scanning, to identify open ports and services on target systems. The botnet can then use this information to determine potential vulnerabilities or attack vectors. Mass scanning performed by botnets serves as a reconnaissance phase, allowing the botnet operators to identify potential targets and vulnerable systems. By scanning for open ports, services, or known vulnerabilities, the botnet can gather information that helps in planning subsequent attacks, such as targeting specific vulnerabilities or exploiting weaknesses in the identified systems. It's important to note that botnets can engage in various other malicious activities beyond mass scanning, including launching distributed denial-of-service (DDoS) attacks, propagating malware, or conducting spam campaigns. Therefore, it is useful to be able to identify a botnet interacting with a given network and to take some action based on the identification.

One method of data collection from large business enterprises for cloud-based computing is through agent based monitoring. In agent-based monitoring, software "agents" are installed on each computing device to collect data and then forward the data to the cloud-based service. Using agent-based monitoring, it may be necessary to install hundreds or thousands of agents on an external network to collect the required data. Each of these agents, in turn, establish an outgoing network connection to provide data to the cloud-based service. While secure transport protocols such as TLS can ensure data security, the overall number of connections to monitor at the business network edge increases substantially. This causes even more noise for network defenders to sift through. By aggregating data at midservers multiple connections can be presented over the network as a single secure connection to enterprise cloud-based systems (wlog using standard VPN or similar encryption-based network transport technologies). Thousands of connections from a large business enterprise can be reduced to a single connection or a small number of connections. It should be noted that another method of gathering data from a business enterprise network is through port mirroring. The terms "agent" and "port mirroring" are exemplary only, and do not exclude other methods of gathering data from a business enterprise network.

Midserver architecture also solves the problem that not all devices support secure data transport. For example, many devices do not natively support sending system log messages using TLS. In order to support system log traffic, the data must be wrapped in a secure protocol before leaving the network. A midserver can provide this type of capability by collecting and wrapping the data before it leaves the network.

The midserver architecture may be designed to operate as a bastion host that runs a collection of containerized services. It is assumed that midservers are cyber security targets and are likely to be compromised at some point. Ideally, therefore, the midserver should be designed to reduce data loss and further access to the enterprise network to which it is attached. Midservers should not be a primary data store, and should only buffer data when connections are lost. Midservers should have only the minimum software necessary to operate, and least privilege should be enforced for access. Midservers may be configured as a single server instance or as a clusters of redundant servers to provide additional resiliency.

The midserver runs a plurality of containerized services that serve to collect, aggregate, analyze, transform, and securely transmit data. The containerized service run by the midserver can be roughly categorized in four ways: traffic processors, sensors, management services, and utilities.

Containers acting as traffic processors are primarily used to receive forwarded traffic from a customer network, transform the traffic if necessary, and then forward the traffic upstream over the primary connection. Several examples of traffic processing containerized services are reverse proxy containers, system log containers, and messaging containers. An example of a reverse proxy containerized service is Nginx. The Nginx proxy (nginx-pxy) provides reverse proxy capabilities that allows customer traffic to send approved data through the midserver. Data and log sources that support the proxy protocol will connect to this service. The service also provides traffic transform capabilities such as http to https forwarding and others as supported by Nginx. In a system log containerized service, the service provides log consolidation and forwarding capabilities for logs sent using the system log protocol. The service also provides message shaping and enrichment such as adding additional contextual fields to log sources if needed. An example of a messaging containerized service is RabbitMQ. The RabbitMQ service acts as a proxy for advanced messaging queueing protocol (AMQP) messages using the Shovel plugin. The service is primarily used for queuing and forwarding of traffic generated by messaging agents, and can support any AMQP traffic as needed. Another traffic processing containerized service example is Consul, which provides service discovery and may be used to support RabbitMQ configurations in a midserver cluster.

Containers acting as sensors can monitor and generate data rather than just process data from other sensors or data sources.

Management containers are used for providing management consoles or services for midserver administrators. Examples of management containers include the Nginx management proxy and Portainer. The Nginx management proxy (nginx-mgt) is responsible for managing connections to management interfaces on containers. This containerized service acts a firewall to only allow traffic to management pages and services originating from approved address spaces. Portainer provides a lightweight management UI which allows administrators to easily manage and monitor the other container services on the midserver.

Utility containers are special purpose tools used to aid in configuration or deployment of a midserver.

Consolidating these containerized services at the midserver allows for large-scale, reliable ingestion (i.e., one or more of collection, aggregating, analysis (pre-processing), transformation (pre-processing), and secure transmission) of data into a cloud-based service from an external network. This improves data consistency, reliability, efficiency of bandwidth usage, and security. Using the midserver as a gateway to the cloud-based service dramatically reduces the number of connections at the business enterprise's network edge, greatly reducing the number of avenues of attack and improving network security.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way.

One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Bastion host" as used herein means a computer that is deliberately exposed on a public network as the primary or only node or the network exposed to the outside world. A bastion host processes and filters all incoming traffic and prevents malicious traffic from entering the network.

"Ingestion" as used herein means the transfer of data into a cloud-based service.

"Midserver" as used herein means a server that functions as an interface between an external network and a cloud-based service, and which runs one or more containerized services that perform one or more of: collecting, aggregating, analyzing, filtering, transforming, and securely transmitting data. A midserver may also be configured as a bastion host.

Conceptual Architecture

FIG. 1 is a diagram of an exemplary midserver system architecture. A network 110 exists connecting a cloud service 130, through a firewall or security layer 112, as well as an on-site security layer or firewall 111 with some organization which may wish to connect over a network 110 to a cloud service 130. A demilitarized zone ("DMZ," also known as a perimeter network or screened subnet) 120 is present which may present the forward-facing network connections and functionality of an organization's network or services, which may be forwarded data or interface further with on-site servers 150 and user endpoints 160, or data log sources 140. On-site servers 150 may include a midserver 151 for collecting, aggregating, analyzing, filtering, transforming, and securely transmitting data transfers and interactions with a cloud service 130, typically co-located with the enterprise domain controller (or Active Directory (AD) server) 152 for exploration of network-enabled directories and to control access to and authenticate security requests on the network for other connected servers 150. A midserver 151 in this implementation may be used for streamlined communications with a cloud service 130 including a single point of connectivity with the service, a ticket form of security adding further security to such a connected system, and a batch method of data transfer, allowing numerous other servers 150 or endpoints 160 or log sources 140 to communicate with the midserver which then collates data for transfer to a cloud server 130, which may further collate data received from the cloud service 130, for ease of analysis and which allows for other forms of network optimization to take place which are not present in systems where numerous endpoints and servers maintain individual connections to a cloud service 130, also allowing for new data sources including servers 150 and endpoints 160 to be added swiftly and integrated into the system for connection to the cloud service 130 rapidly and easily due to the midserver 151 acting as an interface between the service 130 and the other possible endpoint 160 or server 150.

Figure 2:
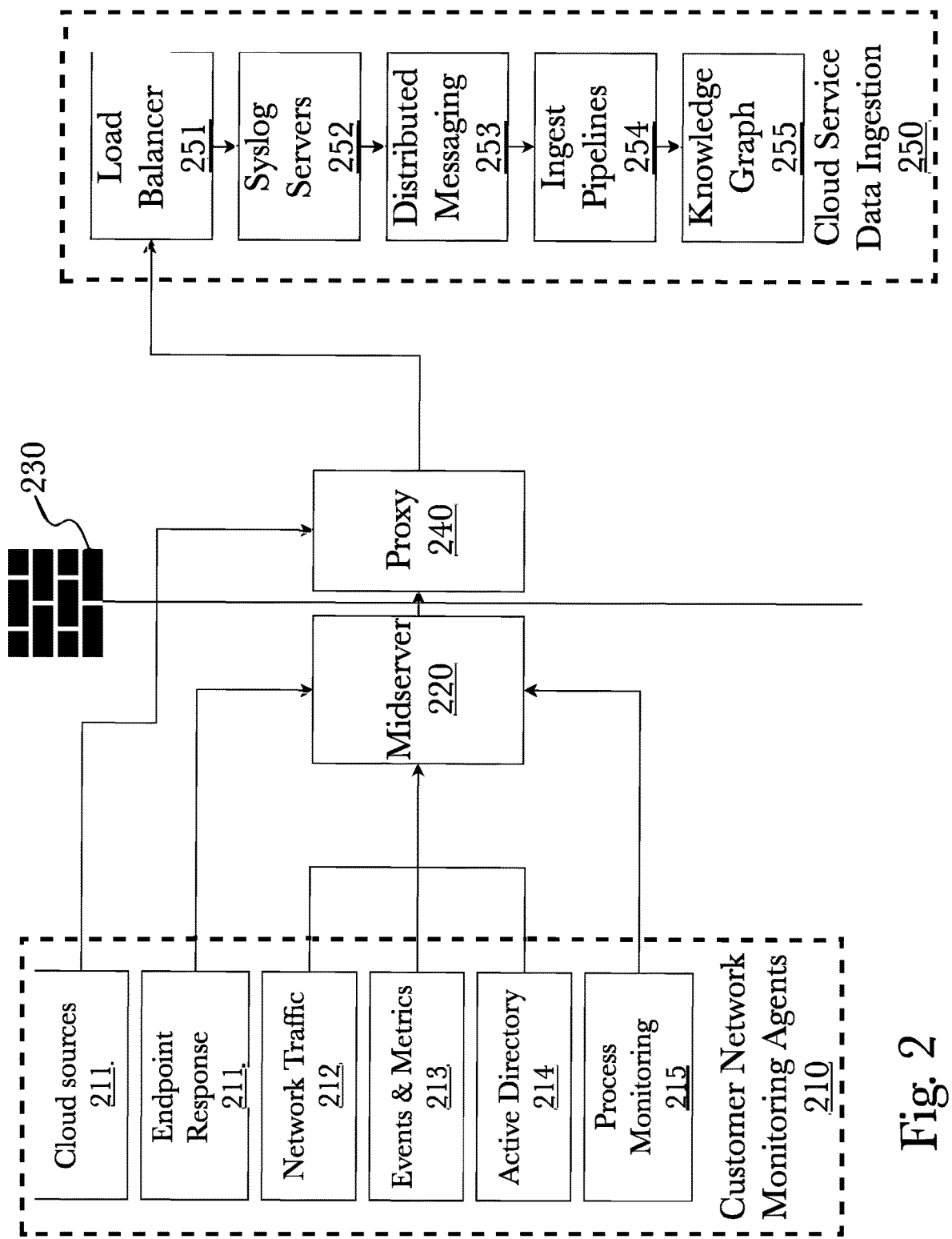
FIG. 2 is a diagram of an exemplary midserver architecture showing data input to a midserver and the ingestion of forwarded data from a midserver through a proxy to a cloud service.

FIG. 2 is a diagram of an exemplary midserver architecture showing data input to a midserver and the ingestion of forwarded data from a midserver through a proxy to a cloud service. Cloud sources 211 of customer monitoring agents 210 may provide input to a proxy server 240 behind a firewall 230 which filters data going in and out of an organization's network. These sources of customer network monitoring agents 210 may include data that is gathered from online tools such as social media crawlers or any other source of customer network monitoring from a cloud service or network 211. On-site data monitoring tools and processes include endpoint responses 211, network traffic data 212, events and metrics 213 which may include metadata about devices, users, or other connected assets, active directory 214 usage, and process monitoring 215 which may monitor active processes on connected assets such as operations performed on a connected network endpoint such as a computer workstation. Data from these sources is sent to a midserver 220 which may be on-site or connected to via a Virtual Private Network (VPN), before the data is sent to through an organizations firewall 230 to a proxy server 240, to be forwarded to a cloud service's data ingestion pipeline 250. Such a data ingestion pipeline 250 may include the use of a load balancer 251 to aid in processing of received data loads from differing sources, system log servers 252 which may record the reception and content of data or any other metadata about the connection to a proxy server 240 and the activity of the load balancer 251, before forwarding data to a distributed messaging system 253 which may separate received data and data streams into related "topics" which may be defined by the sender's identity, metadata about the streams or batches of data, or some other qualifier. Ingestion pipelines 254 may process data by filtering, mapping, parsing, and sanitizing data received, before adding it to a temporal knowledge graph 255 representing a graph of assets, people, events, processes, services, and "tickets" of concerns, as well as data about the edges connecting such nodes in the graph such as their relationship, over time.

Figure 3:
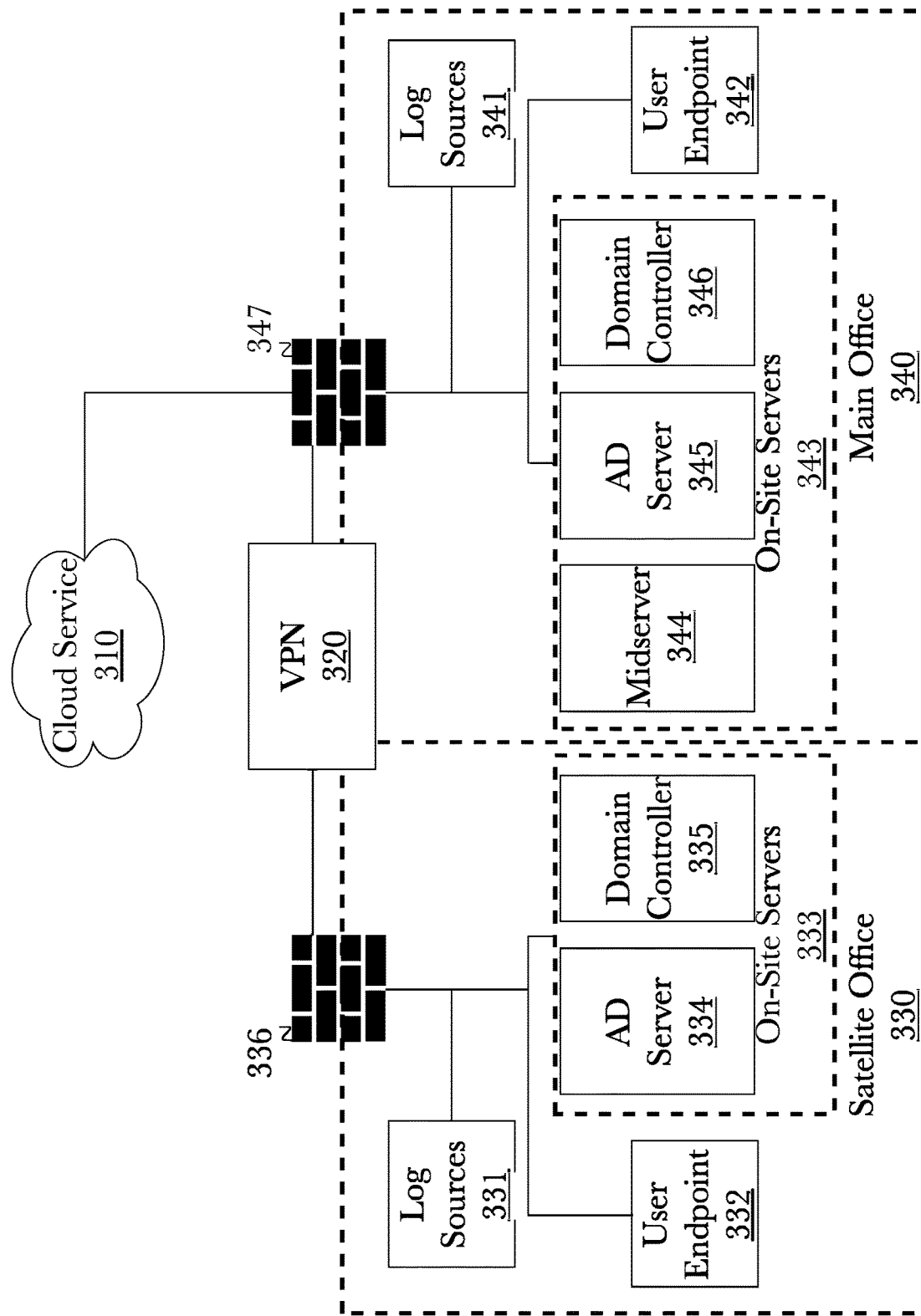
FIG. 3 is a diagram of an exemplary midserver architecture between multiple office locations.

FIG. 3 is a diagram of an exemplary midserver architecture between multiple office locations. A cloud service 310 exists which may connect to a main office 340 but not a satellite office 330 over a network such as the Internet, with a VPN 320 connected between the networks of the offices. A satellite office 330 contains numerous assets including log sources 331, user endpoints 332, and a server or servers 333 which include the functionality of an Active Directory (AD) server 334 and domain controller 335. Also operating on a satellite office 330 is firewall 336, in addition to firewall on a main office's network 347, which provides basic security to a satellite office's network 330 and a main office's network 340. Connected via a VPN 320 with a satellite office 330 is a main office 340, which comprises many of the same components, including log sources 341, at least one user endpoint 342, and a group of servers 343 including at least an AD server 345 and domain controller 346, as well as a midserver 344, which may communicate with a satellite office 330 to provide access to midserver functionality without using the satellite office's 330 bandwidth to external networks. Midservers 344 may be deployed as a single instance, or as a cluster depending on the traffic volume leaving the office 340 premise to support high availability operational requirements. These servers may be co-located with the domain controllers 346 and other servers 343, but may be placed anywhere on the network. The exact number and configuration of midservers 344 may be tailored to the organizational environment and the specific overall network architecture. It is possible to place a midserver 344 (or cluster of such) at the main office 340 only, as shown in FIG. 3. In this configuration, the agents (or log source 331) installed at the satellite office 330 will forward all traffic across the VPN connection 320 to the Midserver 344 at the Main Office 340, which will then forward the traffic to the cloud infrastructure 310 via the gateway at that location.

Figure 4:
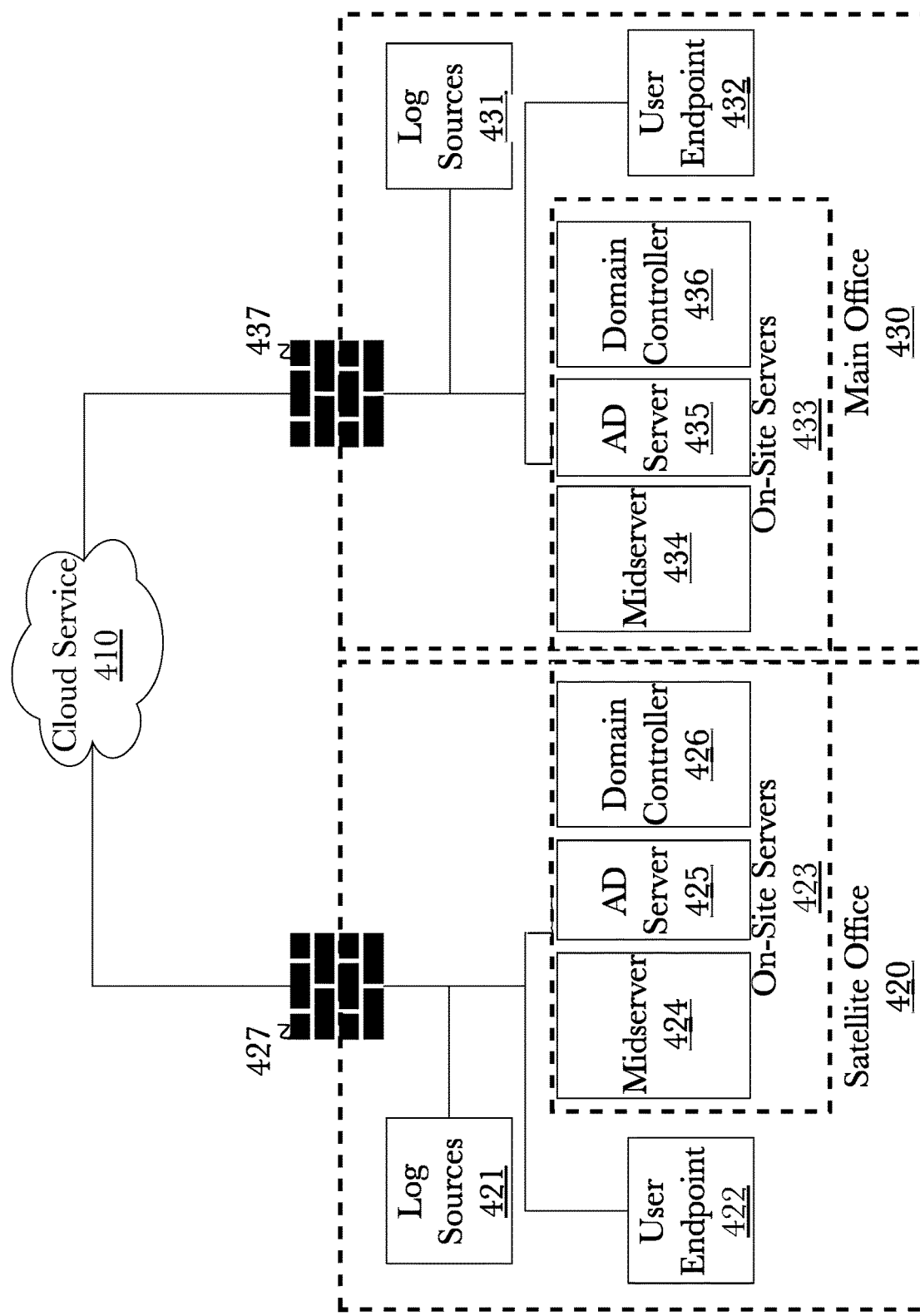
FIG. 4 is diagram of another exemplary midserver architecture between multiple office locations.

FIG. 4 is diagram of another exemplary midserver architecture between multiple office locations. An alternative configuration compared to FIG. 3 is shown, placing one or more midservers at the satellite office and allowing traffic to egress the network locally instead of through a VPN connection to other locations. A cloud service 410 exists which connects directly to a main office 430 and a satellite office 420 over a network such as the Internet. A satellite office 420 contains numerous assets including log sources 421, user endpoints 422, and a server or servers 423 which include the functionality of a midserver 424, an Active Directory (AD) server 425, and a domain controller 426. Also operating on a satellite office 420 is firewall 427, in addition to firewall on a main office's network 437, which provides basic security to a satellite office's network 420 and main office network 430. Connected also with a cloud service 410 is a main office network 430, which comprises many of the same components, including log sources 431, at least one user endpoint 432, and a group of servers 433 including at least an AD server 435 and domain controller 436, as well as a midserver 434, allowing for both office networks 420, 430 to have midserver functionality without requiring a direct or virtual connection.

Figure 5A:
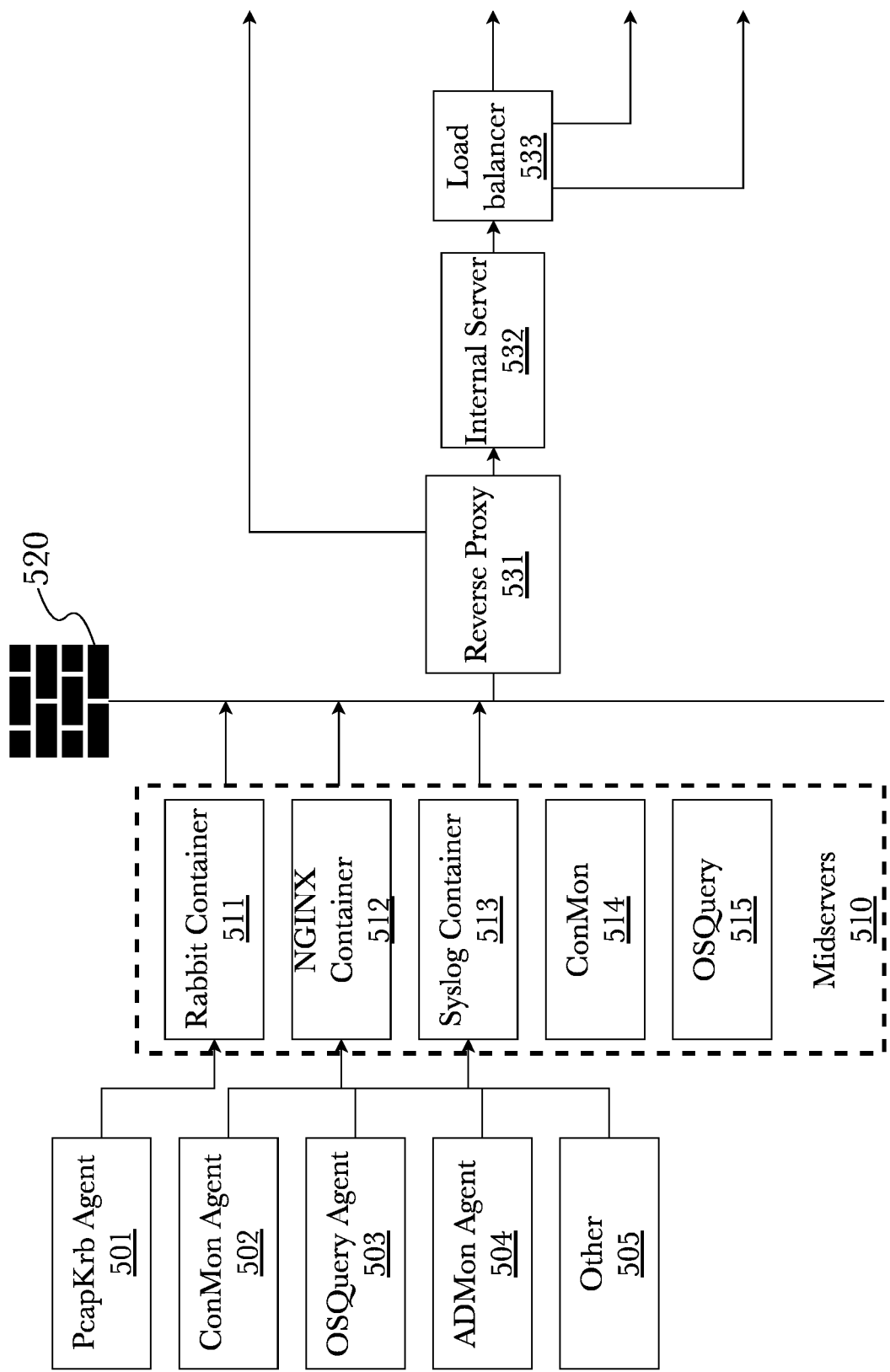
FIG. 5A is a partial diagram of an exemplary advanced cyber-decision platform utilizing midserver architecture.

FIG. 5A is a partial diagram of an exemplary advanced cyber-decision platform utilizing midserver architecture. A plurality of software agents may monitor an organization's network usage, including but not limited to a Kerberos messaging capture (PcapKrb) agent 501 continuous monitoring (Application Performance Monitoring) agents 502, Osquery agents 503, active directory monitoring (ADMon) agents 504, and other agents 505 which may include, for example, data received from system log (syslog) data stores. The plurality of network monitoring agents may feed into a midserver or midservers 510 that may contain message and data processing containerized services, for example: a RabbitMQ container 511, an NGINX container 512, a system log container 513, a continuous monitoring module 514, an Osquery engine 515. The midserver 510 The midserver 510 may communicate through a network firewall 520, to a reverse proxy 531 which may mask the external-facing properties of an internal server 532 of a cloud service. A reverse proxy 531 may forward relevant data, or all data, received from a midserver 510, to an internal server 532, which utilizes a load balancer 533 to process data efficiently and effectively despite possibly asymmetrical or massive network loads, or dynamically changing loads.

Figure 5B:
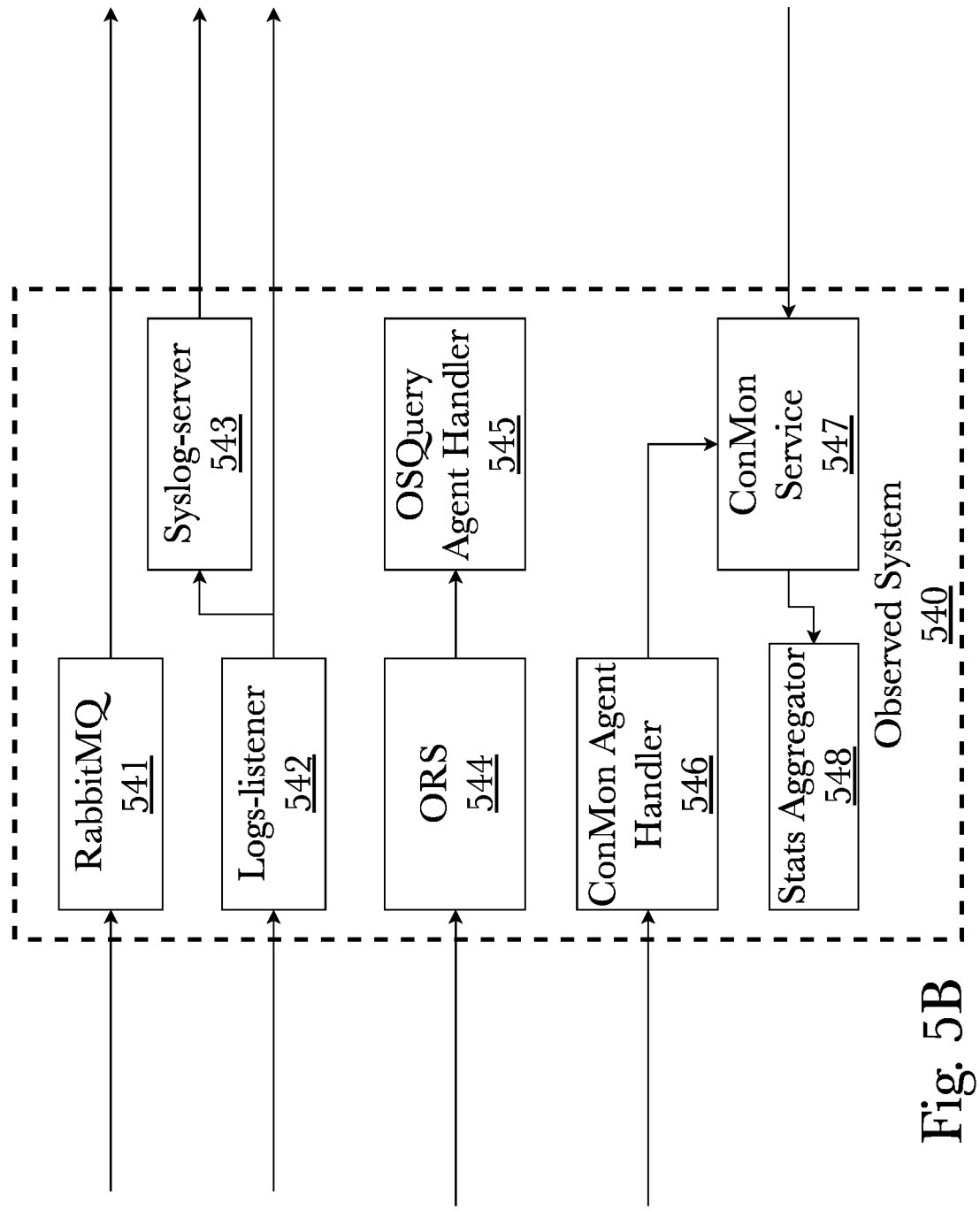
FIG. 5B is a partial diagram of an exemplary advanced cyber-decision platform utilizing midserver architecture.

FIG. 5B is a partial diagram of an exemplary advanced cyber-decision platform utilizing midserver architecture. An observed system 540 is a system that is monitored by an exemplary advanced cyber-decision platform that may communicate with a midserver 510, and may contain at least a message digestion and management service such as RabbitMQ 541, a log listener 542 which communicates with a system log server 543 for the purpose of managing, monitoring, and storing system logs. An observed system may also include an Observer Reporting Server (ORS) 544, which may communicate with an Osquery Agent Handler 545, allowing management, recording, and monitoring of users and systems who use Osquery or a similar system to query a device or server similarly to a database, as is the purpose of Osquery. Also present is a ConMon Agent Handler 546 which my operate as an interface to continuous monitoring connected systems, acting as an interface for a ConMon service 547, which receives further input from systems illustrated in FIG. 5C and may communicate with a statistics aggregator 548.

Figure 5C:
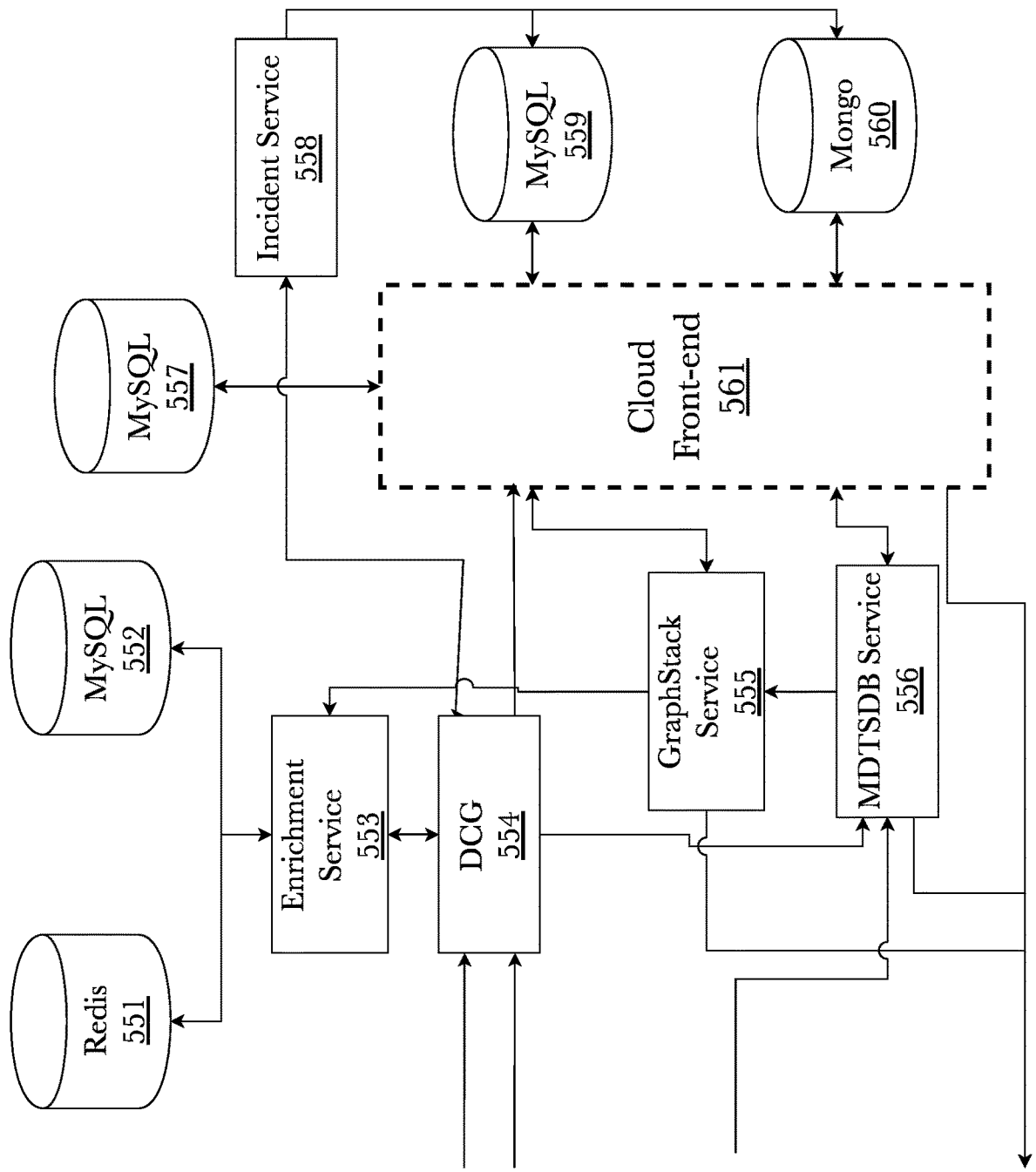
FIG. 5C is a partial diagram of an exemplary advanced cyber-decision platform utilizing midserver architecture.

FIG. 5C is a partial diagram of an exemplary advanced cyber-decision platform utilizing midserver architecture. Data flows from an observed system 540 into a directed computational graph (DCG) 554, and a Multivariate Time-Series Database (MDTSDB) 556. Data from a DCG 554 may move to an enrichment service 553, connected to a plurality of differently structured databases such as MySQL 552 and Redis 551, an enrichment service being able to store and record relevant graph data in these databases 552, 551 and also forward related stored data to a DCG 554, for the purpose of increased accuracy with data processing. A DCG 554 also may send data to a multi-dimensional time series database (MDTSDB) service 556 which relates all received data and records the temporal metadata, resulting in a multidimensional temporal graph with which to relate data, as generated with the help of a graphstack service 555. A graphstack service manages data received from a MDTSDB service 556 and produces the final graph results, with both the results and operation of the MDTSDB 556 and graphstack service 555 being viewable from a cloud service's front end 561, which may also communicate with a plurality of datastores 557, 559, 560. A graphstack service 555 may also forward data to an enrichment service 553 for storage in the connected databases 551, 552, allowing for a constant stream of graph data to be maintained. Lastly, an incident service 558 may be used to receive incident or error data from a directed computational graph 554, recording these incidents in a plurality of databases 559, 560.

Figure 6:
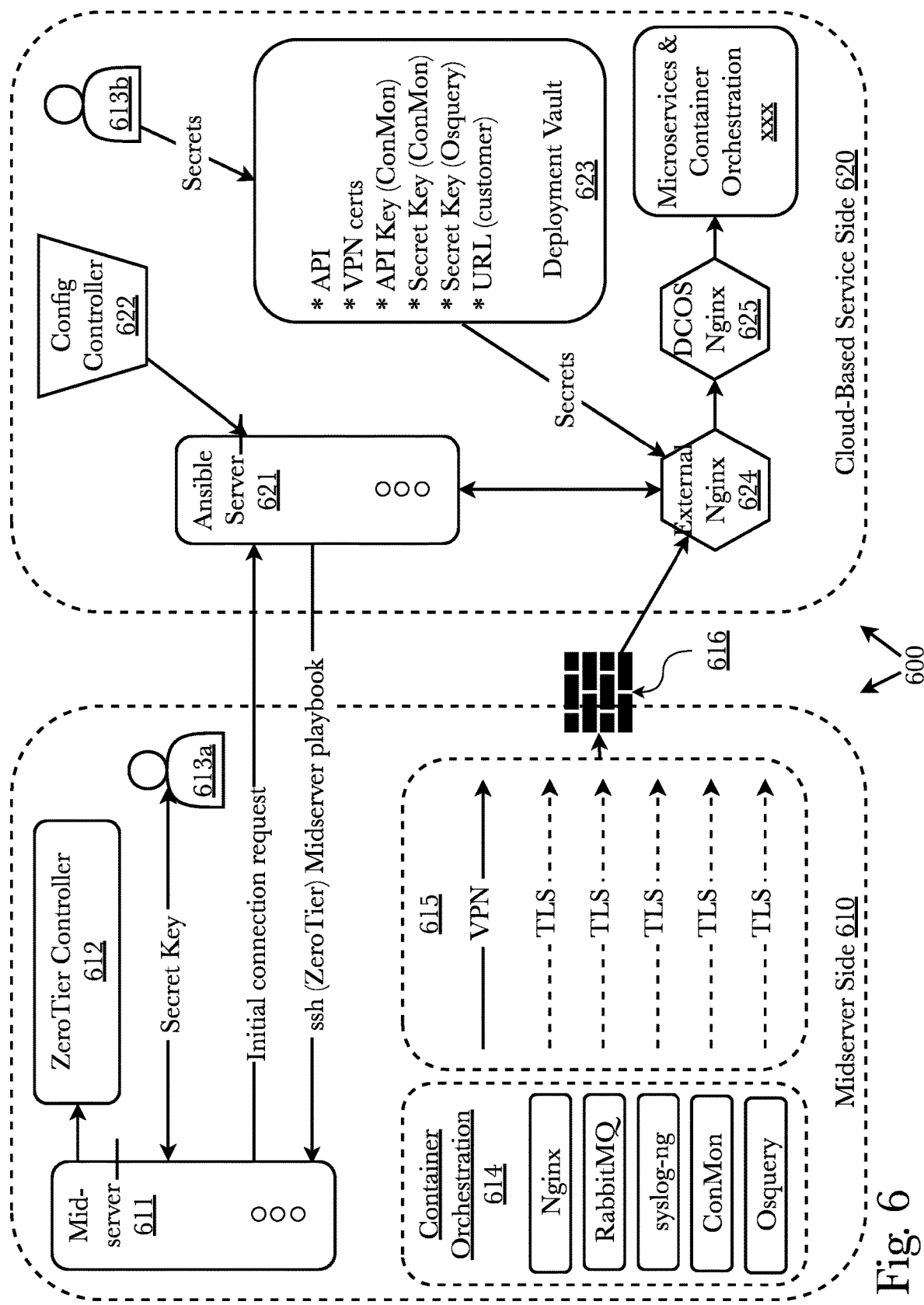
FIG. 6 is a diagram showing an exemplary architecture and methodology for midserver deployment, automated onboarding of data, and endpoint transparent data transport.

FIG. 6 is a diagram showing an exemplary architecture and methodology 600 for midserver deployment, automated onboarding of data, and endpoint transparent data transport. Midserver deployment comprises establishment of a secure connection between the midserver side 610 and the cloud-based service side 620. After a midserver 611 is physically installed, an automated package called a midserver Open Virtual Appliance (OVA) is installed and run on the midserver 611. The OVA in this example is a virtual image pre-installed with only the minimal software on configurations required to initiate the deployment process. The OVA will initiate a bootstrap process to establish a secure Peer-to-Peer (P2P) connection to the cloud-based service side. Using ZeroTier as an example of a P2P connection, the OVA will initiate a ZeroTier Controller 612, which is responsible for admitting members to the VPN, issuing certificates, and issuing default configuration information. ZeroTier establishes a secure P2P connection over a virtually extensible local area network (VXLAN) called the Reachback Network. Once the initial connection is requested, a representative of the cloud-based service, either onsite 613a or offsite 613b, will verify and approve the connection using a secret key. After a secure connection is established between the midserver and the cloud-based service side at an Ansible server 621, an Ansible playbook is automatically initiated. First, the playbook downloads the most recent configuration template from a configuration controller 622. Next it connects to a deployment vault 623 instance to retrieve the customer specific configurations including any secrets (e.g., passwords, keys, etc.) which will have been previously established by a representative of the cloud-based service 613b. A ZeroTier network application programming interface (API) acts as an adhoc Ansible inventory and a single source of truth for which systems have previously connected to the P2P network. Then, the playbook then begins configurating the midserver 611 via an ssh connection tunnel, establishing a primary backhaul virtual private network (VPN) connection to the cloud-based service. Once this connection is made the midserver tears down the Reachback Network and all communication is done over the VPN through a firewall 616 on the customer network edge. The VPN created using this methodology then allows containerized services 614 to forward data using transport layer security (TLS) 615 to the cloud-based service, allowing for long-haul transportation of data that is transparent to the network endpoint. Some implementations may use external web serving, reverse proxying, caching, and load balancing such as external Nginx 624, data center load balancing and caching such as DCOS Nginx 625, and microservices and container orchestration such as Nginx Plus 626.

Figure 7:
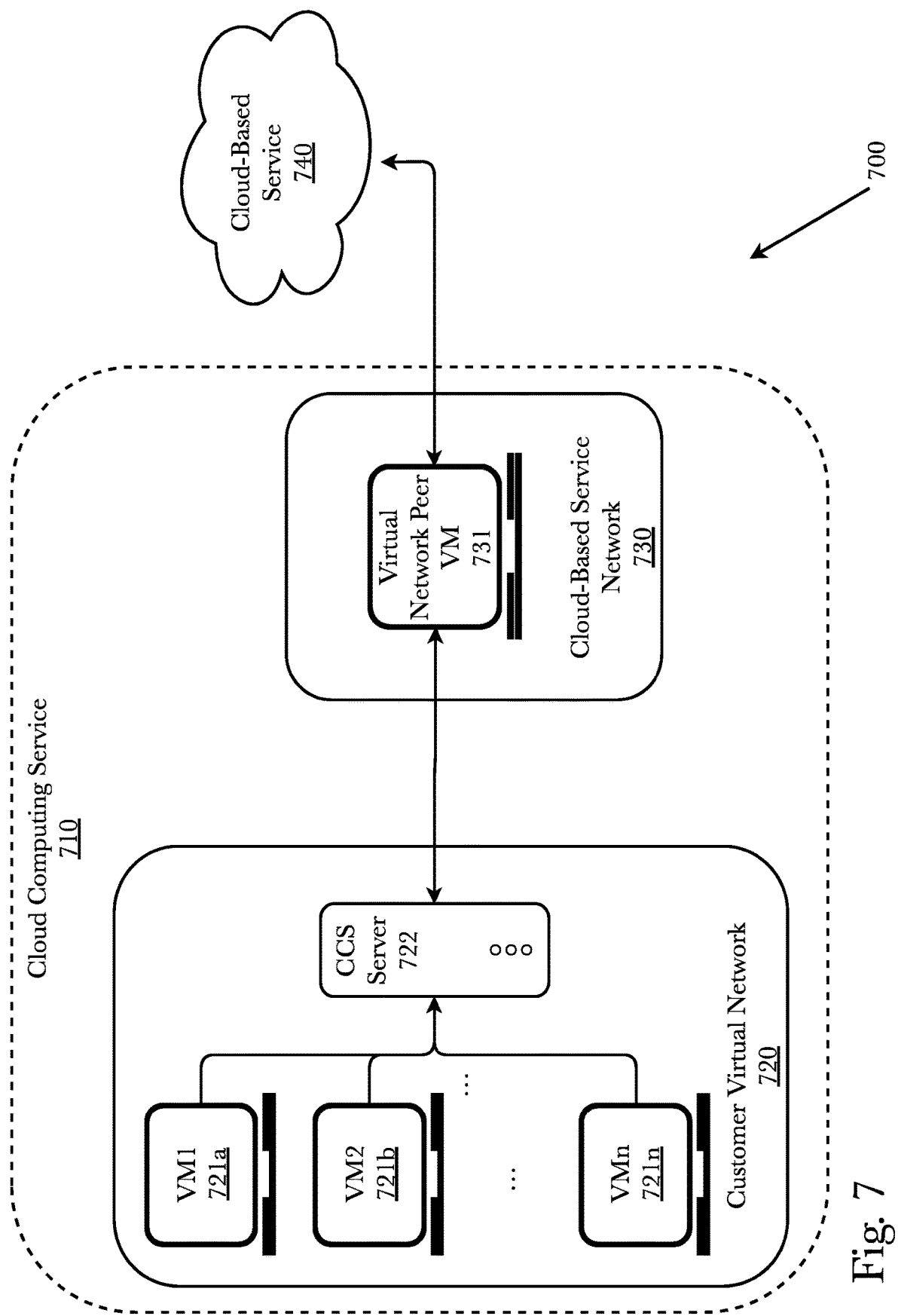
FIG. 7 is an exemplary method for deploying a midserver where the business enterprise network is located on, or utilizes, a cloud computing service such as Amazon Web Services (AWS) or Microsoft's Azure.

FIG. 7 is an exemplary method 700 for deploying a midserver where the business enterprise network is located on, or utilizes, a cloud computing service such as Amazon Web Services (AWS) or Microsoft's Azure. In cloud computing services, all or part of the business enterprise's network is run on the servers of the cloud computing service. Use of midserver architecture where the business enterprise utilizes cloud computing services poses difficulties because the cloud computing service infrastructure is not controlled by the business enterprise, and thus the business enterprise may not be able to authorize the installation of $3^{rd}$ party software (e.g., Kerberos agents, and other software agents that monitor network traffic) on all or a part of its network. The solution to this problem is to utilize the cloud computing service's functions that allow continuous streaming of virtual machine network traffic to a network packet collector or analytics tool. Using Microsoft's Azure Active Directory service and its virtual network terminal access point (vTAP) as an example, the Azure Active Directory (Azure AD) is a cloud-based identity and access management service that allows employees of a business enterprise to access both external and internal resources. The vTAP function allows continuous streaming of cloud computing service network traffic to a network packet collector or analytics tool, and operates in a manner roughly equivalent to traditional port mirroring. Where the business enterprise manages its own network of virtual machines on the cloud computing service, it may still be possible to install software agents, although use of a continuous streaming function may be more efficient. Where the business enterprise uses the cloud computing service for managed domain services, however, the business enterprise does not have authorization to install agents, and the continuous streaming (port mirroring) function will need to be used to deploy a midserver architecture. In this example, a customer (business enterprise) virtual network 720 is established within the cloud computing service 710. The customer virtual network comprises a number of virtual machines 721a-n, operated on one or more of the cloud computing service 710 servers 722. Separately, a cloud-based service network is established on the cloud computing service 710 and is controlled by the cloud-based service 740 to which data is to be forwarded. Using the continuous streaming function available on the cloud computing service 710, for example vTAP for the Azure Active Directory service, a virtual machine on the cloud-based service network 730 is established as a virtual network peer VM 731 to the customer virtual network 720, and all data from the customer virtual network 720 is continuously streamed from the cloud computing service server(s) 722 to the virtual network peer VM 731, which forwards the data to the cloud-based service 740.

Figure 8:
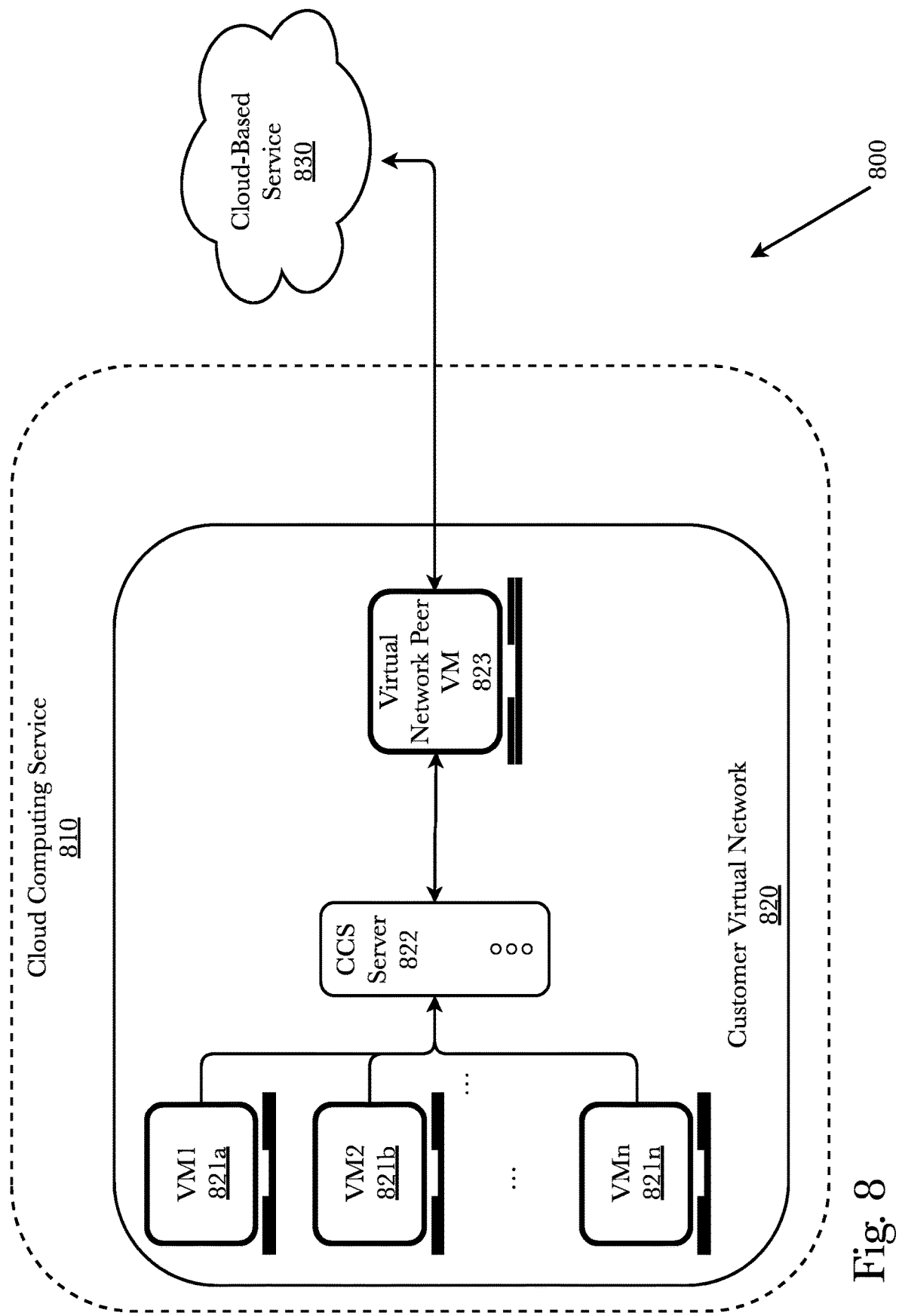
FIG. 8 is another exemplary method for deploying a midserver where the business enterprise network is located on, or utilizes, a cloud computing service such as Amazon Web Services (AWS) or Microsoft's Azure.

FIG. 8 is another exemplary method 800 for deploying a midserver where the business enterprise network is located on, or utilizes, a cloud computing service such as Amazon Web Services (AWS) or Microsoft's Azure. In this example, a customer (business enterprise) virtual network 820 is established within the cloud computing service 810. The customer virtual network comprises a number of virtual machines 821a-n, operated on one or more of the cloud computing service 810 servers 822. The customer also operates on the customer virtual network 820 a virtual network peer VM 823 that is configured to aggregate and forward data to the cloud-based service 830, using the continuous streaming function available on the cloud computing service 810, for example vTAP for the Azure Active Directory service. In this manner, all data from the customer virtual network 820 is continuously streamed from the cloud computing service server(s) 822 to the virtual network peer VM 823, which forwards the data to the cloud-based service 830.

Figure 9:
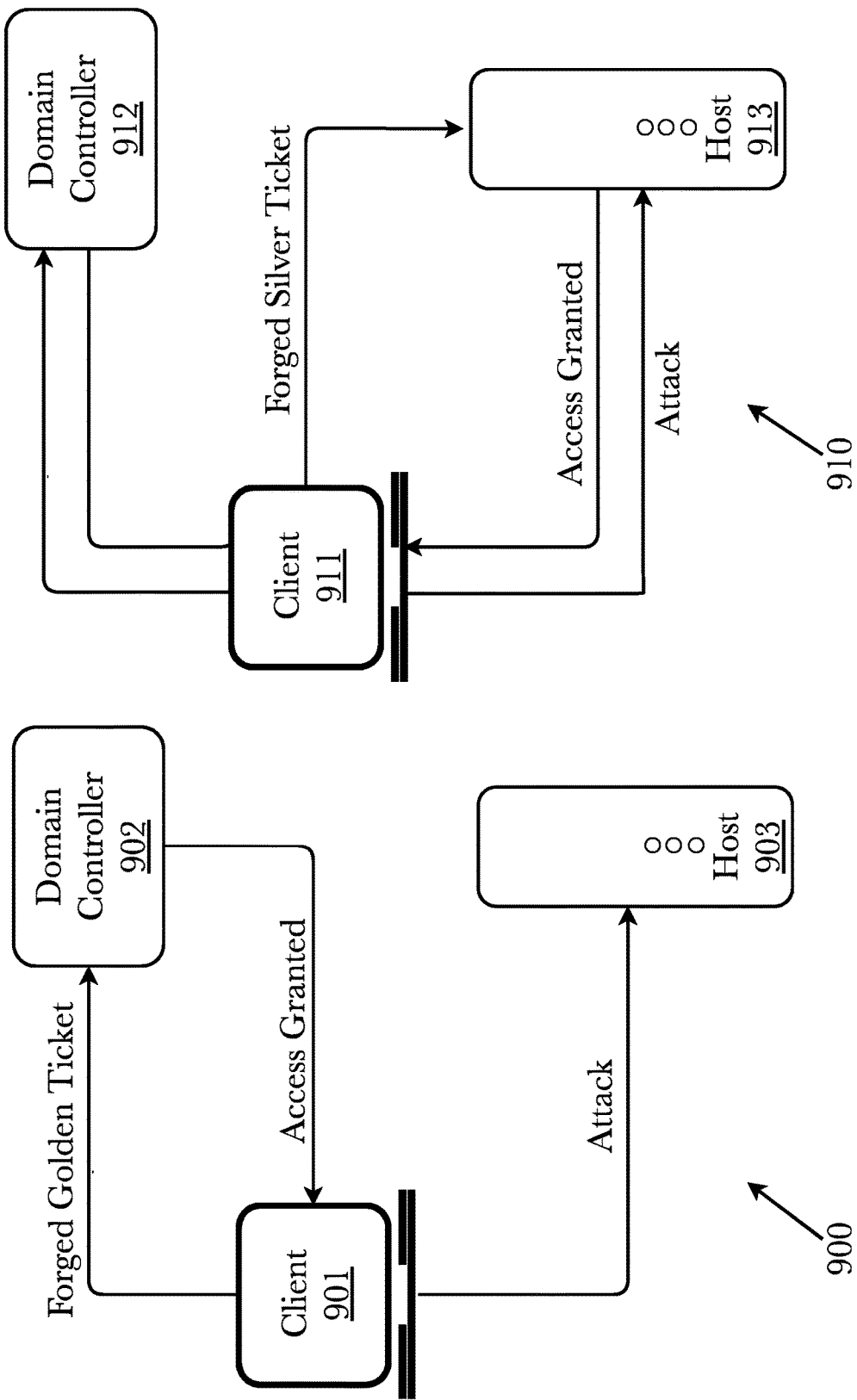
FIG. 9 is a diagram showing an overview of the methodology of two of several known Kerberos attacks.

FIG. 9 is a diagram showing an overview of the methodology of two of several known Kerberos attacks. In the so-called "golden ticket" attack 900, after a client computer 901 has been compromised, a forged ticket is sent to the domain controller 902, which grants access to all servers in the network, and the host server 903 is accessed using the granted access. In the so-called "silver ticket" attack 910, after a client computer 911 has been compromised, a forged ticket granting service (TGS) ticket is sent directly to the host server 913 to be attacked. The host server receiving the forged TGS ticket grants access to the client computer 911 to grant access tickets, which are then used to access the host server 913. Unlike in the golden ticket attack, in the silver ticket attack, the domain controller 912 is not involved in granting access.

Figure 10:
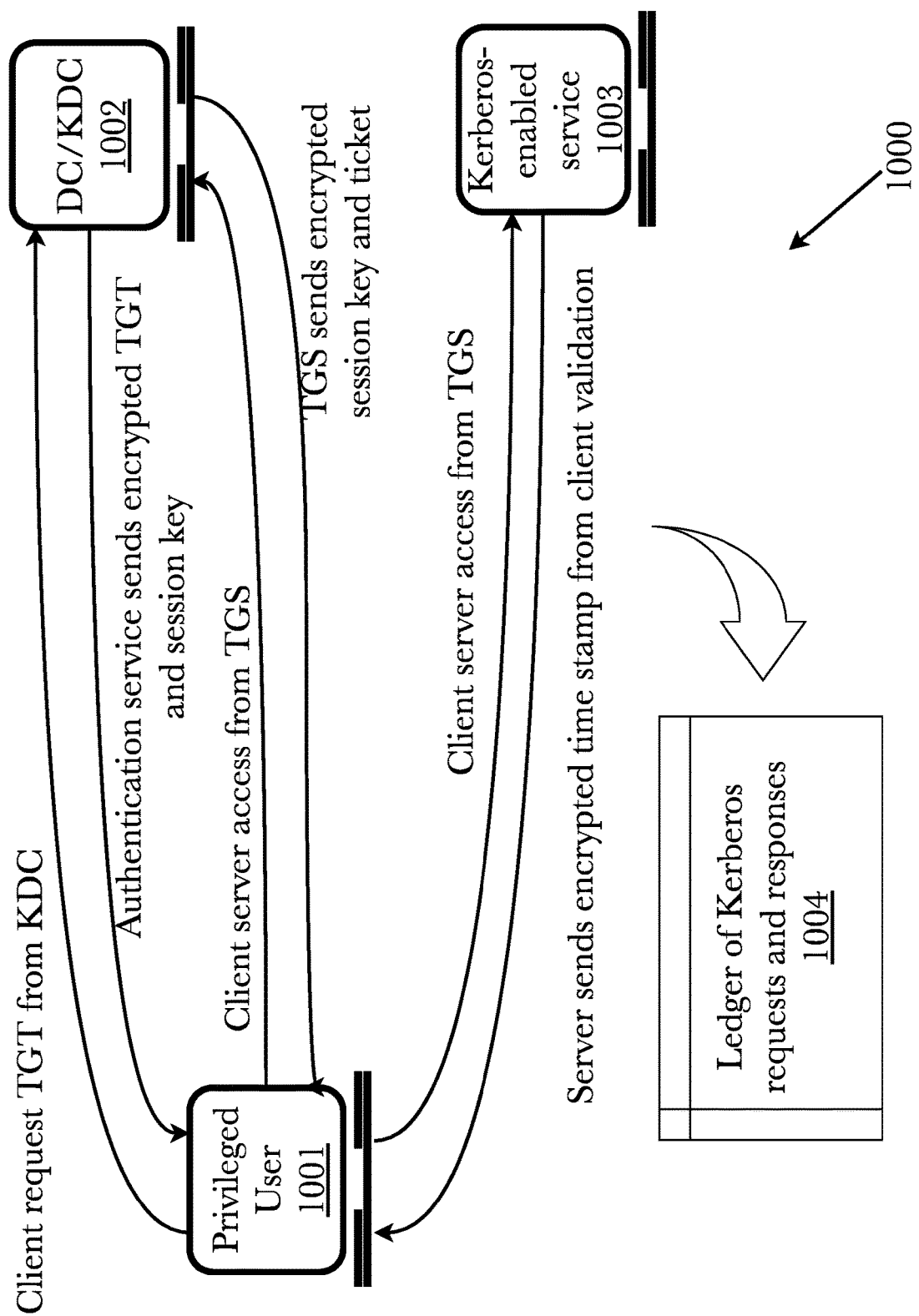
FIG. 10 is a diagram showing an overview of the use of a ledger of Kerberos requests and responses to provide security against Kerberos attacks.

FIG. 10 is a diagram showing an overview of the use of a ledger of Kerberos requests and responses to provide security against Kerberos attacks 1000. In a typical Kerberos authentication interaction, several requests and responses are sent between a user computer 1001, a domain controller, 1002, and a Kerberos-enabled service 1003. Maintaining a ledger 1004 of these requests and responses effectively transforms the Kerberos protocol from a stateless to a stateful one, allowing confirmation of the validity of traffic and providing additional protection against Kerberos attacks.

Figure 11A:
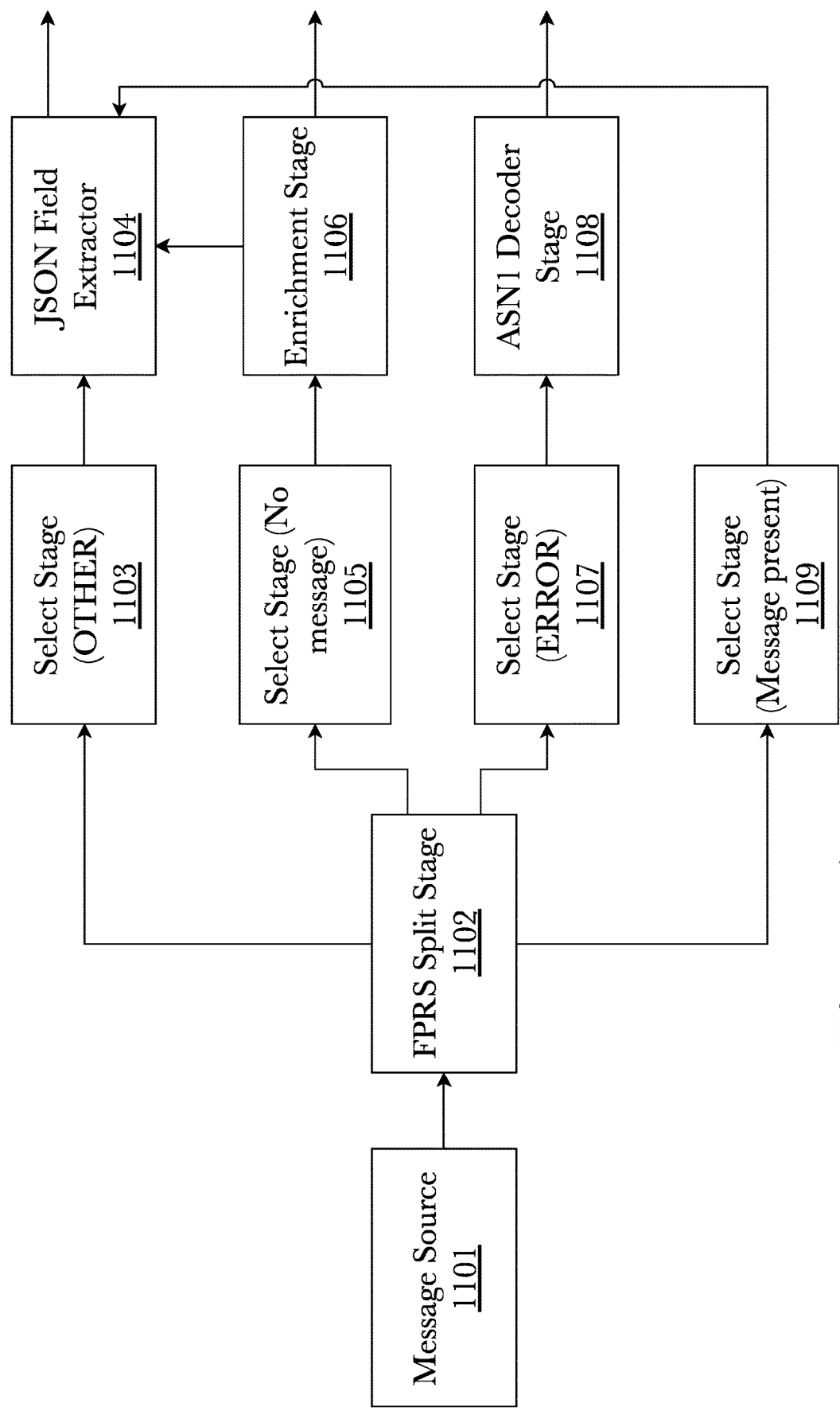
FIG. 11A is a partial diagram of an exemplary analytic workflow for validation of a Kerberos ticket-based security protocol for use in an observed system.

FIG. 11A is a partial diagram of a security analytic workflow validating an exemplary Kerberos ticket-based security protocol for use in an observed system in order to detect common attacks against the Kerberos protocol including those known by the industry as Golden Ticket, Silver Ticket, DCSync, and DCShadow. A messaging source 1101, such as RabbitMQ or NGINX, forwards received data messages to a FPRS split stage 1102, where specific message states are determined and separated to identify high priority tickets, and sent through appropriate processing pipelines. An "OTHER" stage 1103 represents unknown ticket priority and is forwarded to a JSON field extractor 1104 which extracts relevant data fields in Javascript Object Notation (JSON), which is a common data format for object representation in data analytics. A stage where no message is present 1105 represents a ticket with missing information, therefore being sent for an enrichment stage 1106 before being sent to a similar JSON field extractor 1104. An error stage 1107 may also be reached, resulting in the ticket being sent to an Abstract Syntax Notation One (ASN1) decoder 1108, ASN1 being a standard interface description language for defining data structures. If an otherwise normal message is present for a ticket stage 1109, it is sent directly for JSON field extraction 1104.

Figure 11B:
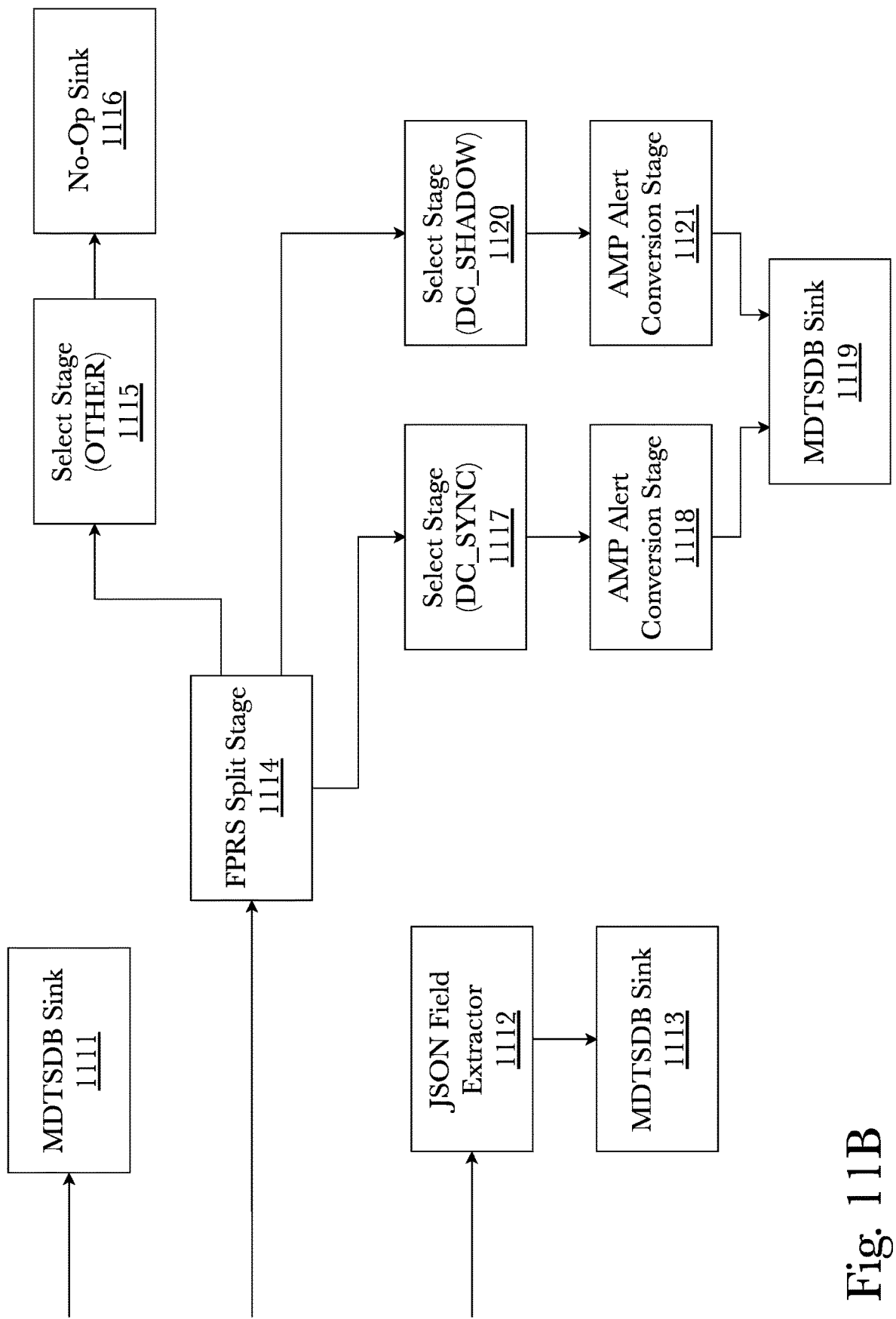
FIG. 11B is a partial diagram of an exemplary analytic workflow for validation of a Kerberos ticket-based security protocol for use in an observed system.

FIG. 11B is a partial diagram of a security analytic workflow validating an exemplary Kerberos ticket-based security protocol for use in an observed system in order to detect common attacks against the Kerberos protocol including those known by the industry as Golden Ticket, Silver Ticket, DCSync, and DCShadow. JSON field data that is extracted 1104 is then forwarded for being placed into a MDTSDB 1111, resulting in it being stored for later use in a temporal knowledge graph. After an error message is ASN1 decoded 1108, it is sent for JSON field extraction 1112, before also being recorded in a MDTSDB 1113. Once a no-message stage has been enriched 1106, it is sent to a secondary FPRS split stage 1114, where the enriched ticket is now determined to possess either an unknown or "OTHER" stage message 1115 and not stored anywhere 1116, or it has a DC_SYNC 1117 or DC_SHADOW 1120 message. In either of the latter two cases the message is converted into an exemplary advanced malware protection (AMP) alert 1118, 1121 and stored in an MDTSDB 1119.

Figure 12:
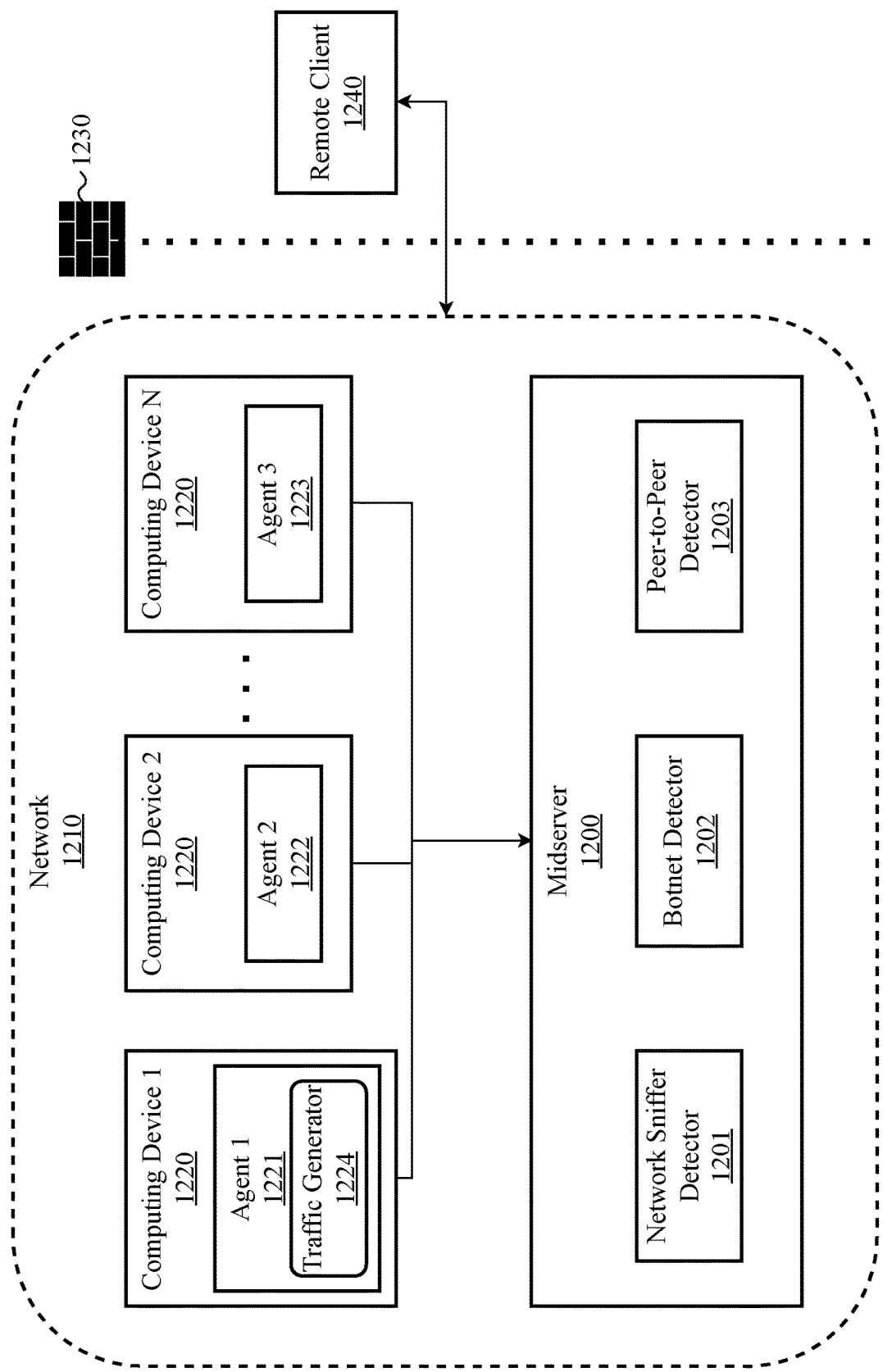
FIG. 12 is a block diagram illustrating an exemplary system architecture for network traffic detection and analysis using a midserver, according to an embodiment.

FIG. 12 is a block diagram illustrating an exemplary system architecture for network traffic detection and analysis using a midserver, according to an embodiment. According to the embodiment, midserver 1200 may be functioning as a component of a network 1210 along with various network computing devices 1220 (also referred to as host device) and other network components (e.g., switches, routers, gateways, servers, authentication services, etc.). According to the embodiment, computing devices 1220 may be configured with an agent 1221, 1222, 1223 which can act as a sensor monitoring and collecting data at the computing device before forwarding data to midserver 1200. According to some embodiments, one or more of the agents operating on computing devices 1220 may be configured to operate a traffic generator 1224. The system further comprises a remote client 1240 (also referred to as an intruder or intruder device) which may attempt to access network 1210 or which the network may attempt to connect with (e.g., in a peer-to-peer application scenario where a computing device attempts to connect to a peer-to-peer application. A firewall 1230 may be present and configured to operate as security mechanism regulating traffic transmission and connections between network 1210 resources and remote client 1240. In some implementations, firewall 1230 and midserver 1200 may be integrated into a single system wherein midserver 1200 provides firewall functions and capabilities in addition to other midserver functions described herein.

Midserver 1200 may be configured to emulate or replace a network device, such as a host device, providing one or more network services. Midserver 1200 may receive a plurality of data from various sources including (for example, but not limited to) a plurality of software monitoring agents operating on various network devices, a plurality of sensors configured to monitor, store, process, and forward network scanning traffic data, and/or various network nodes (e.g., network devices such as servers, routers, switches, gateways, etc.).

Agent 1221, 1222, 1223 may include any device or combination of devices capable of transmitting traffic to midserver. In some embodiments, agent transmits fake or trap packets to midserver in order to lure intruder devices 1240 running network sniffers to midserver. The trap packets may include authentication information (e.g., use name/password combinations) to network services gated by midserver.

According to some embodiments, network sniffer detector 1201 may be configured to analyze network traffic received by midserver 1200 to determine an attempted network intrusion via network sniffing detection. Network sniffer detector acts to detect, contain, and monitor intrusions to midserver and/or network 1210. In some implementations, midserver 1200 looks and acts like a network device, though it provides no actual production or operating environment network services. Thus, all unauthorized activity directed to midserver is detected by network sniffer 1201 as a possible exploit. Network sniffer may then record all keystrokes and functions invoked by the intruder. In some implementations, network sniffer detector 1201 may comprise a false operation system which emulates an operating system that may be implemented on another network device in the system. The false operating system allows intruders to compromise and interact with false operating system as they would an actual operating system. Applications can include applications capable of providing one or more network services. In some embodiments, applications are capable of providing network services associated with an authentication (e.g., login) process. Similar to the false operating system, the applications allow intruders to compromise and interact with applications as they would actual applications.

Agent 1221, 1222, 1223 may include one or more devices for generating traffic 1224 for transmission to midserver. In some implementations, agent 1221, 1222, 122 generates successful and/or failure authentication traffic. This traffic may be transmitted from agent to midserver to entice an intruder sniffing network packets for username/password combinations. destined to network servers. Other types of traffic that may be of interest to intruders running network sniffers may also be generated and transmitted by agent to midserver. The generation and transmission of traffic may occur at predetermined or random intervals. If midserver receives a network packet which is not a trap packet, then it may classify the received network packet as suspicious. In some implementations, network sniffer detector 1201 may classify packets as suspicious based on the time it was received. Agents can be configured to transmit trap packets at predetermined intervals, and if network sniffer detector 1201 receives packets at any time other than the predetermined intervals, the packets can be classified as suspicious. Expected traffic (e.g., trap packets) may be ignored. If the traffic is classified as suspicious, network sniffer detector 1201 captures the packet and can store the captured packet in a data storage device (e.g., database). This data can be used for analyzing the intrusion or taking remedial actions. In some implementations, when a suspicious packet is detected midserver 1200 may generate a notification or implement an alarm system which can notify a network administrator that unexpected traffic has been detected.

According to some embodiments, midserver 1200 may further comprise a peer-to-peer detector 1203 configured to identify encrypted peer-to-peer (P2P) traffic and block such peer-to-peer application traffic. Various P2P applications (e.g., applications that use various P2P communication protocols) are used to download files (e.g., P2P file sharing applications for sharing files, and/or other content, which can be copyrighted content such as music, movies, and books), chat, perform Voice Over Internet Protocol (VoIP) calls or video conferencing, or performing other activities that can be in conflict with network usage policy of an enterprise or organization. For example, such peer-to-peer applications can slow down network performance, expose the enterprise network and enterprise devices to malware, and/or expose the enterprise or organization to potential risks of liability for copyright infringement. In some implementations, P2P detector 1203 provide encrypted P2P detection by monitoring network traffic from a client 1240 to determine that the client is sending a request for information for a peer-to-peer application executing on the client: and generating a network traffic response to the client that emulates peer-to-peer traffic. In some embodiments, P2P detector 1203 may comprise a P2P traffic generator for generating emulated P2P network traffic. In some embodiments, P2P traffic may be detected by P2P detector 1203 using protocol-based signature detection techniques to identify P2P traffic associated with a P2P application. For example, packet information including protocol and IP address can be used to determine that a network device is attempting to access a P2P application.

Additionally, or alternatively, P2P detector 1203 can detect encrypted peer-to-peer traffic using emulated P2P traffic generation to determine whether a session is associated with a P2P application. If the session traffic is encrypted (e.g., using TCP for file transfers) and cannot be decrypted by midserver 1200, and does not match any firewall rules classifying the session as known good or known bad, then midserver 1200 may classify the session traffic as unknown. P2P detector 1203 may check to determine if the network device was previously connected to a P2P application. For example, it may be determined that the network device was previously executing a P2P application which communicates data using encrypted communications. In some implementations, after detecting an unknown traffic sent from a local network device to a remote client P2P detector 1203 generates and sends emulated and compliant P2P traffic to the remote client (e.g., spoofing the emulated P2P traffic is being sent from another client executing the P2P application). For example, midserver 1200 can use an IP address associated with the midserver 1200 and select a port number that is used for emulated P2P traffic communications. P2P detector 1203 can send UDP communications, which are communicated in the clear, for an initial setup/handshake between peer clients using P2P protocol, and it is running on the same port that the peer is accepting the TCP connection. Midserver 1200 can then monitor responses from the remote client to determine whether the client is also executing a P2P application on that particular port. If midserver 1200 determines that the remote client is also executing a P2P application, then the unknown or unclassified session can be categorized as a P2P session. This session information may be stored in midserver for later usage.

Thus, while there can be legitimate uses of high port numbers/arbitrary port numbers and encrypted traffic, such as for legitimate or corporate/enterprise authorized usage of VoIP web/video conferencing, and/or other applications/ network communication activities, this technique allows for a heuristic-based verification that the encrypted traffic session between network devices and remote client is (or is very likely) associated with the peer-to peer application to thereby effectively identify the encrypted peer-to-peer using emulated peer-to-peer traffic and reducing the risk of false positives. As a result, using these encrypted peer-to-peer detection techniques, unknown network traffic flows/sessions (e.g., unidentified/unknown sessions that are suspicious) from a client determined to be executing a peer to-peer application can be determined to be associated with the peer-to-peer application and can be blocked and/or further actions can be taken as described herein with respect to various embodiments.

According to some embodiments, midserver 1200 may comprise a botnet detector 1202 configured to provide heuristic botnet detection. Heuristic botnet detection refers to the use of heuristic techniques and algorithms to identify and detect botnet activity or the presence of botnets within a network or system. A botnet is a network of compromised computers or devices controlled by a central entity, often referred to as a bot master or bot herder. Botnets are typically used for malicious activities, such as distributed denial-of-service (DDoS) attacks, spam campaigns, or malware propagation. Heuristic botnet detection approaches involve analyzing patterns, behaviors, and characteristics that are indicative of botnet activity. Rather than relying on known signatures or specific indicators, heuristic detection methods use algorithms and rules that evaluate the overall behavior and attributes of network traffic, systems, or devices to identify potential botnet-related activities.

Heuristic botnet detection includes monitoring network traffic to identify suspicious network traffic and using heuristic analysis to detect a bot. Suspicious traffic may include command and control traffic associated with a bot master. In some implementations, a score may be assigned to the monitored network traffic, wherein the score corresponds to a botnet risk. In some embodiments, determining the suspicious behavior is associated with botnet based on the risk score. Botnet detector 1202 may act as an engine for performing heuristic behavior analysis on the monitored traffic. In some embodiments, botnet detector 1202 identifies suspicious botnet behavior including, but not limited to, command and control (C&C) communications and malware downloads. Botnets rely on C&C communication channels to receive instructions from the botmaster and coordinate the actions of compromised devices. Heuristic botnet detection techniques analyze network traffic to identify suspicious communication patterns or characteristics associated with C&C traffic. In some implementations, generic C&C patterns are used to identify C&C patterns as described herein. In some implementations, specific C&C patterns are used to identify C&C patterns. For example, botnet detector 1202 can be updated with new generic C&C pattern-based heuristics, new specific C&C pattern-based heuristics, or both, which can be received as a software and/or malware/heuristics related content update using various software and/or content push or pull related updating techniques. Heuristic botnet detection involves monitoring network traffic or system behavior to identify abnormal patterns and activities. This can include analyzing communication patterns, traffic volume, packet frequencies, or deviations from normal network behavior. Heuristic methods often focus on detecting anomalies that deviate from expected behavior. By establishing a baseline of normal network or system behavior, any deviations or unusual activities can be flagged as potential botnet-related behavior.

In some implementations, botnet detector 1202 may leverage machine learning algorithms to detect and classify botnet activity based on patterns and features extracted from network traffic or system behavior. Machine learning models can be trained on labeled datasets to learn and identify botnet-related patterns automatically.

According to an embodiment, midserver 1200 can establish a secure connection with an external network. Data may be transmitted between midserver 1200 and the external network via the secure connection. In some implementations, the external network can provide mass scanning traffic information to midserver 1200 for analysis.

Figure 13:
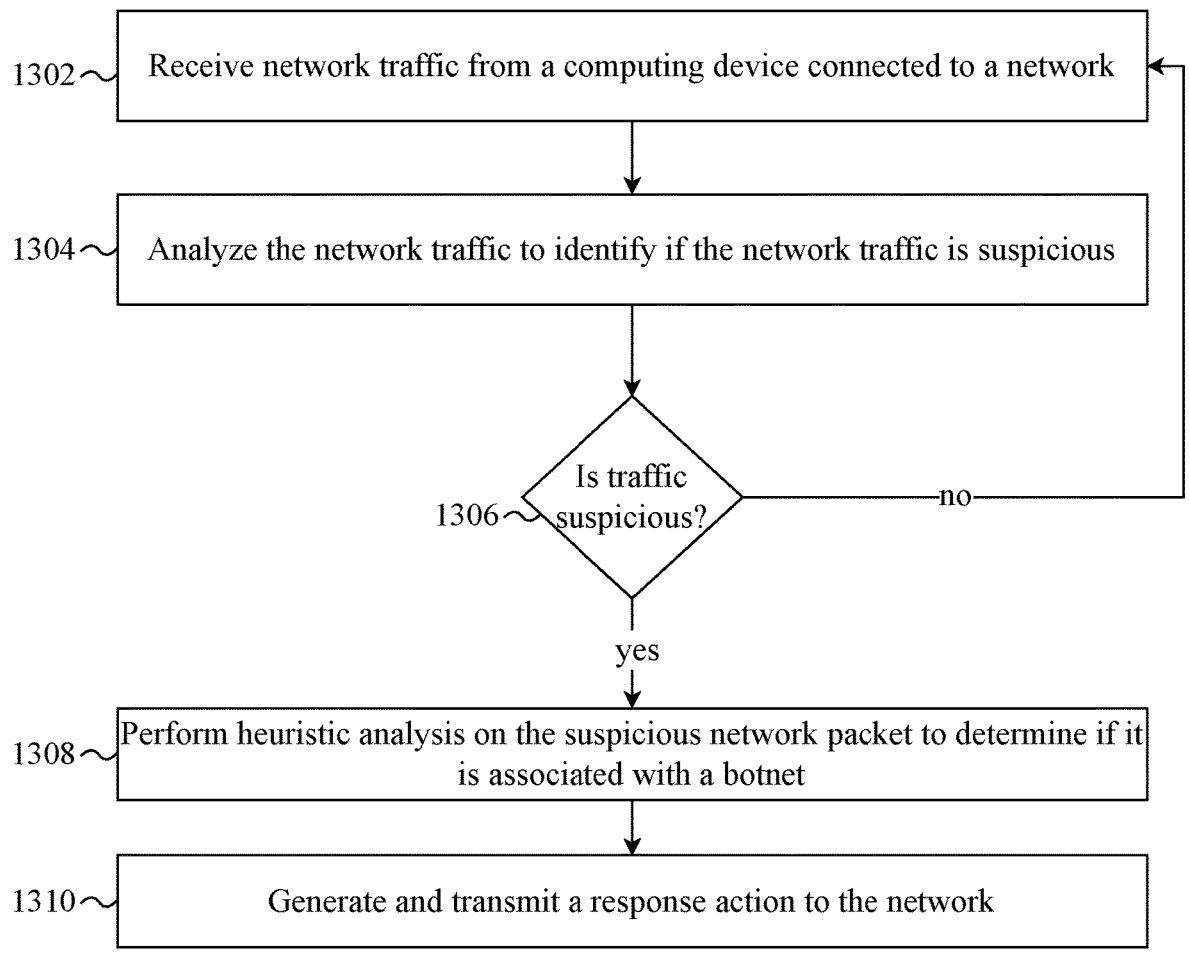
FIG. 13 is a flow diagram illustrating an exemplary method for analyzing network traffic data to detect a mass scanning event associated with a botnet, according to an embodiment.

FIG. 13 is a flow diagram illustrating an exemplary method for analyzing network traffic data to detect a mass scanning event associated with a botnet, according to an embodiment. According to the embodiment, the process begins at step 1302 when a midserver 1200 configured to provide capabilities to detect a botnet receives network traffic from or directed to a computing device connected to a network. The network may be a local network in which the midserver may also be a component. At step 1304 midserver analyzes the network traffic to identify if the network traffic is suspicious. At 1306 if the traffic is identified as not suspicious, then the process returns to step 1302 and repeats. If, instead, at 1306 the traffic is identified as suspicious then the process continues to step 1308 wherein midserver 1200 may perform heuristic analysis on the suspicious network packet to determine if it is associated with a botnet. At step 1310 midserver 1200 can generate and transmit a response action to the network or a network administrator based on the heuristic analysis. For example, the response action may be an alert which is generated and transmitted to a network administrator, the alert comprising an indication of a mass scan event. In some implementations, the mass scan event is associated with a detected botnet. In some embodiments, the response action may comprise a set of instructions or system configurations that can be distributed and applied to one or more of the network connected devices. For example, the response action may comprise software patches/updates, firewall rules and/or whitelist and/or blacklist, performing a security audit, and/or the like.

Figure 14:
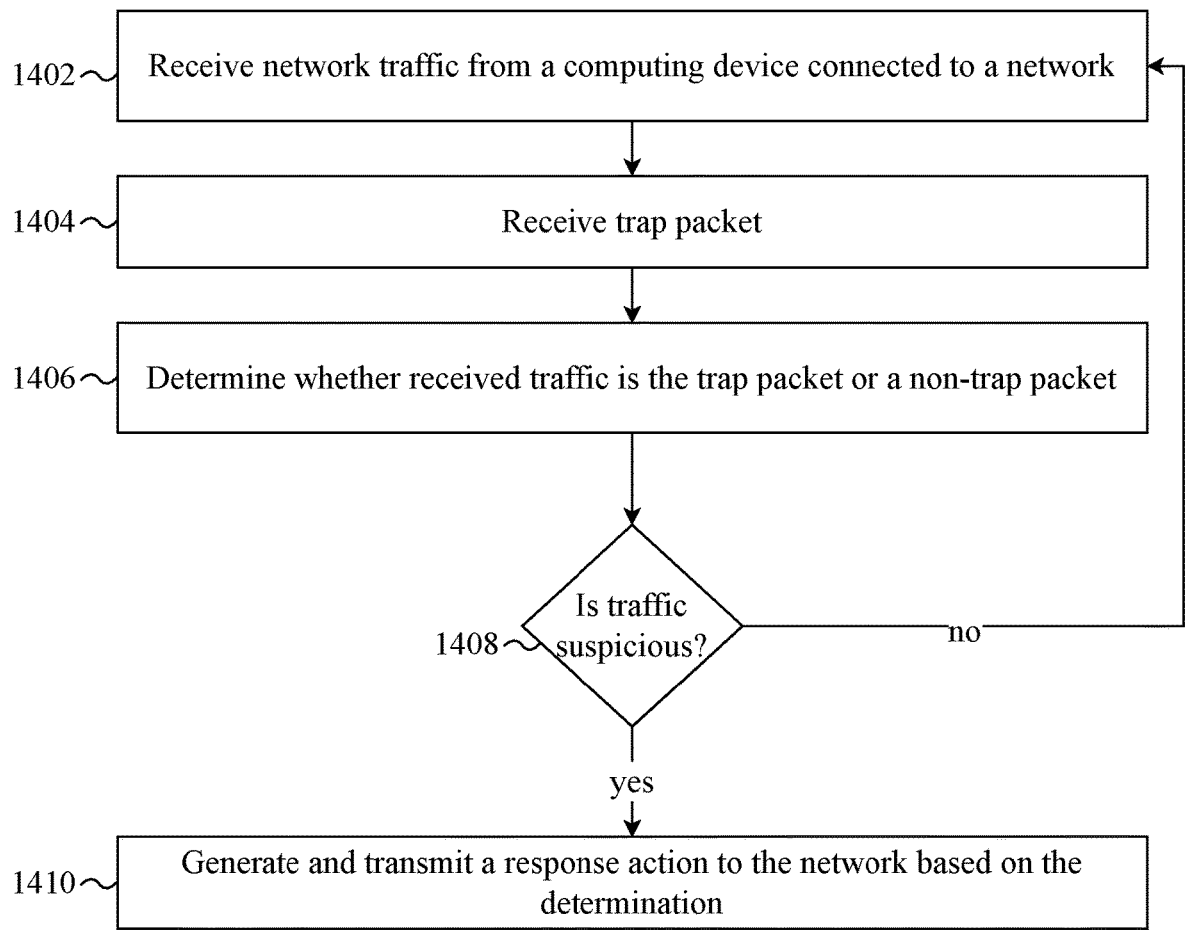
FIG. 14 is a flow diagram illustrating an exemplary method for analyzing network traffic data to detect a mass scanning event associated with a network sniffer, according to an embodiment.

FIG. 14 is a flow diagram illustrating an exemplary method for analyzing network traffic data to detect a mass scanning event associated with a network sniffer, according to an embodiment. According to the embodiment, the process begins at step 1402 when a midserver 1200 configured to provide capabilities to detect a network sniffer receives network traffic from or directed to a computing device connected to a network. The network may be a local network in which the midserver may also be a component. At step 1404 midserver receives a trap packet from an agent 1221, 1222, 1223 operating on a network connected computing device. The trap packet may contain fake information and the purpose of the trap packet is to entice an intruder using a network sniffer to attempt to connect with the network. At step 1406 the midserver may determine if the received network traffic is a trap packet or a non-trap packet. At 1408 is determined if the traffic is suspicious based on the determination of the previous step. Trap packets are expected traffic and thus deemed not suspicious and receiving a trap packet causes midserver to disregard the trap packet at the process returns to step 1402. Non-trap packet traffic may then be considered suspicious, and the process continues to step 1410 wherein midserver may generate and transmit a response action to the network or a network administrator based on the determination of suspicious or not. For example, the response action may be an alert which is generated and transmitted to a network administrator, the alert comprising an indication of a mass scan event. In some implementations, the mass scan event is associated with a detected intruder using a network sniffer. In some embodiments, the response action may comprise a set of instructions or system configurations that can be distributed and applied to one or more of the network connected devices. For example, the response action may comprise software patches/updates, implementation of strong encryption protocols, implement network access control solutions that authenticate and authorize devices, performing a security audit, segmenting the network (e.g., divide the network into separate VLANs to restrict access), and/or the like.

Figure 15:
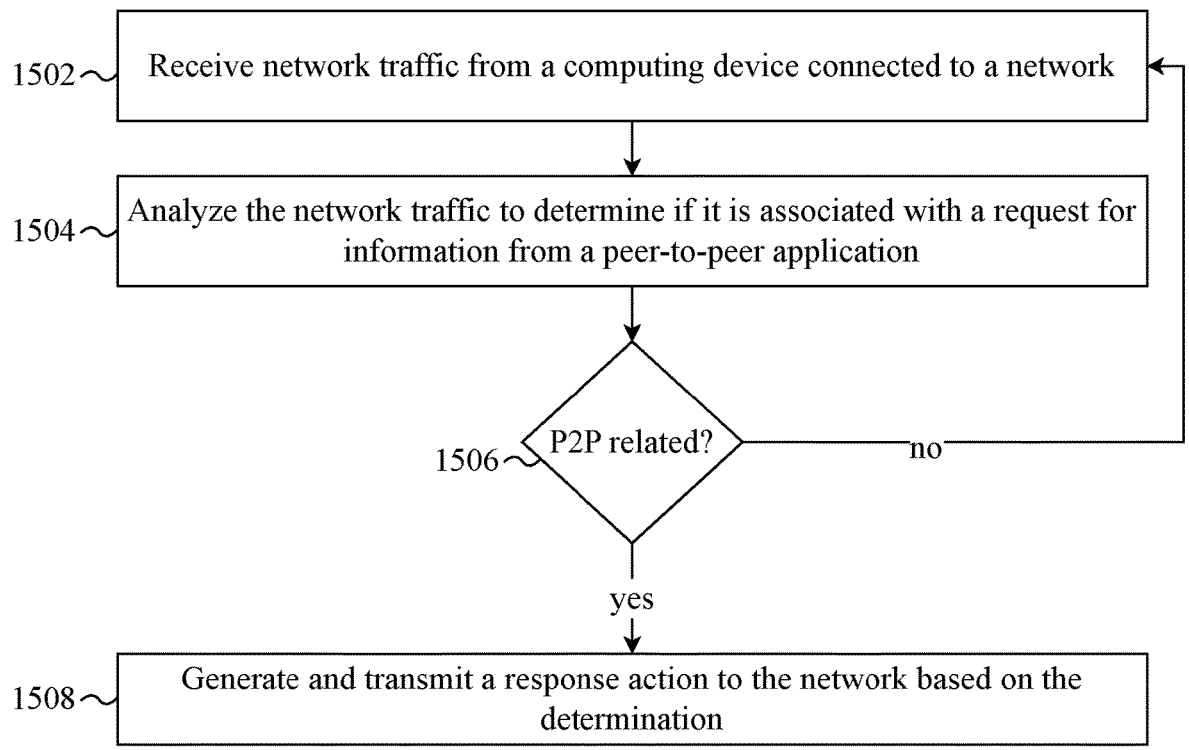
FIG. 15 is a flow diagram illustrating an exemplary method for analyzing network traffic data to detect an encrypted P2P connection in the network, according to an embodiment.

FIG. 15 is a flow diagram illustrating an exemplary method for analyzing network traffic data to detect an encrypted P2P connection in the network, according to an embodiment. According to the embodiment, the process begins at step 1502 when a midserver 1200 configured to provide capabilities to detect a P2P connection to a P2P application receives network traffic from or directed to a computing device connected to a network. The network may be a local network in which the midserver may also be a component. At step 1504 midserver analyzes the network traffic to determine if it is associated with a request to for information form a peer-to-peer application. The trap packet may contain fake information and the purpose of the trap packet is to entice an intruder using a network sniffer to attempt to connect with the network. At 1506 if the network traffic is not P2P related, then the process returns to step 1502. If, instead, at 1506 the network traffic is P2P related, then the process continues to step 1508 wherein midserver may generate and transmit a response action to the network or a network administrator based on the determination of an attempted P2P connection. For example, the response action may be an alert which is generated and transmitted to a network administrator, the alert comprising an indication of a P2P connection. In some embodiments, the response action may comprise a set of instructions or system configurations that can be distributed and applied to one or more of the network connected devices. For example, the response action may comprise a command to block the attempted connection between the network computing device and the P2P application.

Exemplary Computing Environment

Figure 16:
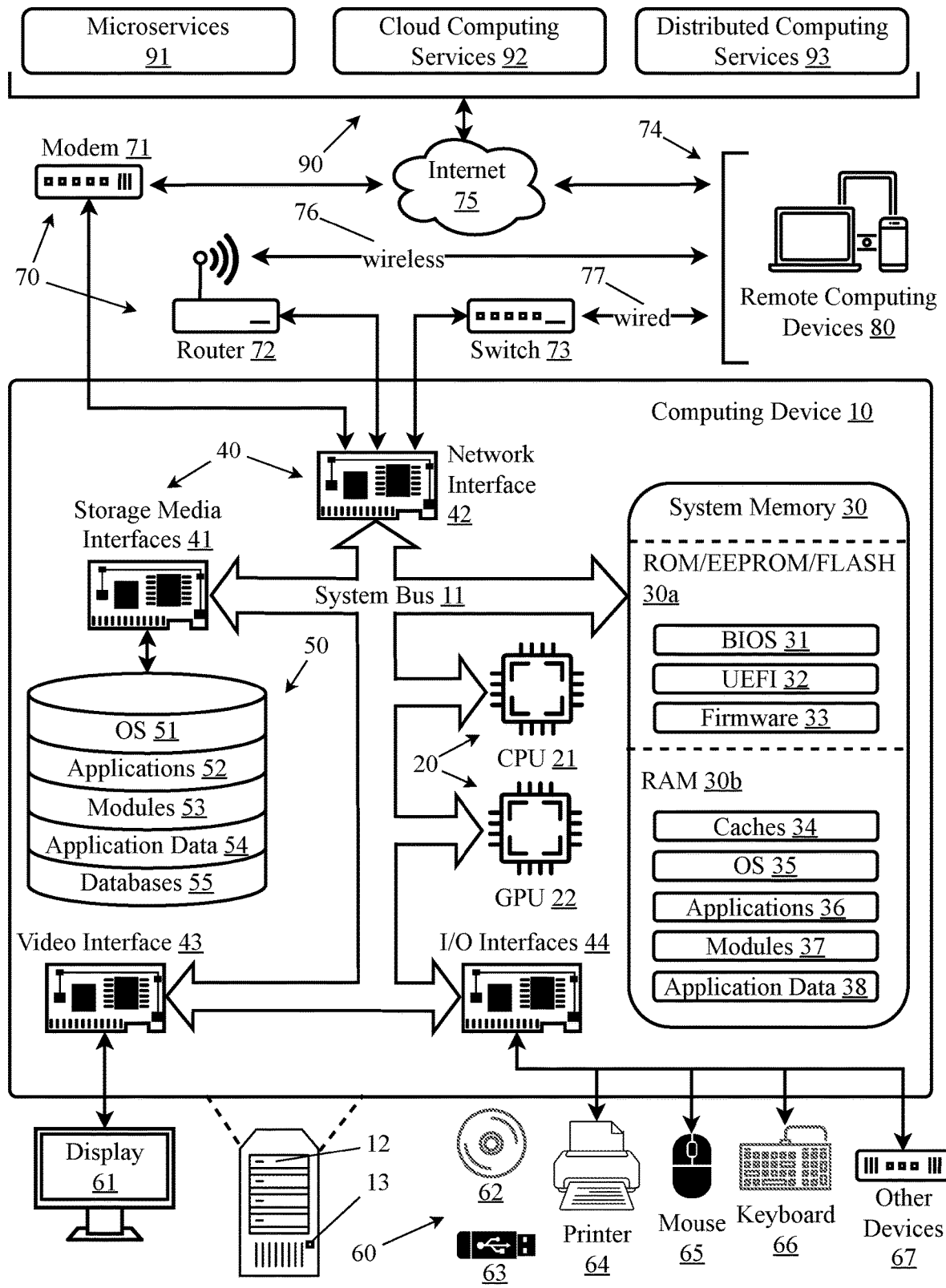
FIG. 16 illustrates an exemplary computing environment on which an embodiment described herein may be implemented, in full or in part.

FIG. 16 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for network traffic mass scan event detection and analysis:
    a midserver comprising at least a processor, a memory, and a plurality of programming instructions stored in the memory and operating on the processor, wherein the plurality of programming instructions, when operating on the processor, cause the processor to:
       automatically install a virtual appliance software application, the virtual appliance software application configured to automatically load a plurality of stored configurations on the midserver;
       establish a secure network connection to an external network;
       receive data over a local network from a plurality of computing devices;
       receive network traffic bound for the local network;
       analyze the network traffic to identify if the network traffic is suspicious;
       determine if the network traffic is associated with a botnet by performing heuristic analysis on network traffic identified as suspicious, wherein the heuristic analysis comprises monitoring the behavior of the network traffic; and execute a responsive action on the local network based on the results of the heuristic analysis.

2. The system of claim 1, wherein the responsive action is generating an alert to a network administrator, the alert indicating a mass scan event has been detected.

3. The system of claim 2, wherein the mass scan event is performed by a botnet.

4. The system of claim 1, wherein at least one computing device of the plurality of computing devices has a software agent stored and operating on the at least one computing device, the software agent configured to generate and transmit a trap packet to the midserver.

5. The system of claim 4, wherein the midserver is further configured to:
receive the trap packet from the software agent;
determine if the network traffic is associated with a network sniffer by configuring the midserver to determine whether received network traffic is the trap packet or a non-trap packet based on at least a subset of the stored plurality of configurations on the midserver;
generate an alert to a network administrator, the alert indicating a mass scan event has been detected.

6. The system of claim 5, wherein the mass scan event is performed by a network sniffer.

7. The system of claim 1, wherein the midserver is further configured to:
determine if the network traffic is associated with a request for information from a peer-to-peer (P2P) application by using protocol-based signature detection; and
execute a responsive action on the local network based on the results of the protocol-based signature detection.

8. The system of claim 7, wherein the responsive action is blocking the P2P application from connecting with local network.

9. A method for network traffic mass scan event detection and analysis, comprising the steps of:
automatically installing a virtual appliance software application, the virtual appliance software application configured to automatically load a plurality of stored configurations on the midserver;
establishing a secure network connection to an external network;
receiving data over a local network from a plurality of computing devices;
receiving network traffic bound for the local network;
analyzing the network traffic to identify if the network traffic is suspicious;
determining if the network traffic is associated with a botnet by performing heuristic analysis on network traffic identified as suspicious, wherein the heuristic analysis comprises monitoring the behavior of the network traffic; and
executing a responsive action on the local network based on the results of the heuristic analysis.

10. The method of claim 9, wherein the responsive action is generating an alert to a network administrator, the alert indicating a mass scan event has been detected.

11. The method of claim 10 wherein the mass scan event is performed by a botnet.

12. The method of claim 9, wherein at least one computing device of the plurality of computing devices has a software agent stored and operating on the at least one computing device, the software agent configured to generate and transmit a trap packet to the midserver.

13. The method of claim 12, further comprising the steps of:
receiving the trap packet from the software agent;
determining if the network traffic is associated with a network sniffer by configuring the midserver to determine whether received network traffic is the trap packet or a non-trap packet based on at least a subset of the stored plurality of configurations on the midserver; and
generating an alert to a network administrator, the alert indicating a mass scan event has been detected.

14. The method of claim 13, wherein the mass scan event is performed by a network sniffer.

15. The method of claim 9, further comprising the steps of:
determining if the network traffic is associated with a request for information from a peer-to-peer (P2P) application by using protocol-based signature detection; and
executing a responsive action on the local network based on the results of the protocol-based signature detection.

16. The method of claim 15, wherein the responsive action is blocking the P2P application from connecting with local network.

\* \* \* \* \*